United States Patent
Shibahara et al.

(10) Patent No.: US 7,046,343 B2
(45) Date of Patent: May 16, 2006

(54) METHOD AND APPARATUS FOR RECOGNIZING REGIONS CORRESPONDING TO IMAGE STORAGE SHEETS

(75) Inventors: Yoshihiko Shibahara, Minamiashigara (JP); Akira Yoda, Minamiashigara (JP); Shinpei Ikenoue, Minamiashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 820 days.

(21) Appl. No.: 09/731,973

(22) Filed: Dec. 8, 2000

(65) Prior Publication Data
US 2001/0028475 A1    Oct. 11, 2001

(30) Foreign Application Priority Data
Dec. 8, 1999    (JP)    ................... 11-348597

(51) Int. Cl.
*H04N 1/00*    (2006.01)
(52) U.S. Cl. ...................... 355/406; 358/504
(58) Field of Classification Search ............... 358/401, 358/406, 474, 461, 465, 471, 462, 479, 501, 358/504, 505, 529, 530; 355/120, 128, 131
See application file for complete search history.

(56) References Cited

U.S. PATENT DOCUMENTS

| | | | |
|---|---|---|---|
| 4,338,020 A | | 7/1982 | Yukawa et al. ............... 355/41 |
| 4,415,261 A | * | 11/1983 | Yukawa et al. ............... 355/75 |
| 4,963,934 A | * | 10/1990 | Nezu ............................ 399/86 |
| 5,764,380 A | | 6/1998 | Noguchi ..................... 358/488 |
| 6,587,233 B1 | * | 7/2003 | Salgado ..................... 358/505 |

FOREIGN PATENT DOCUMENTS

| | | |
|---|---|---|
| JP | 56-22424 | 3/1981 |
| JP | 56-62274 | 5/1981 |
| JP | 56-105579 | 8/1981 |
| JP | 2-131662 | 5/1990 |
| JP | 5-110779 | 4/1993 |
| JP | 05110779 | * 4/1993 |
| JP | 5-122466 | 5/1993 |
| JP | 5-130337 | 5/1993 |
| JP | 5-134329 | 5/1993 |
| JP | 06152875 | * 5/1994 |
| JP | 8-139848 | 5/1996 |

(Continued)

OTHER PUBLICATIONS

Abstract JP 10222688 A, Aug. 21, 1998.

(Continued)

*Primary Examiner*—Jerome Grant, II
(74) *Attorney, Agent, or Firm*—Sughrue Mion, PLLC

(57) ABSTRACT

A read-out image is acquired by covering an image storage sheet, which contains a color image, with an image storage sheet pushing surface of a platen cover and reading out an image of a region on the image storage sheet pushing surface of the platen cover, the region on the image storage sheet pushing surface containing the image storage sheet. A region corresponding to the image storage sheet in the read-out image is then recognized. The image storage sheet pushing surface of the platen cover has a color other than colors which are ordinarily contained in image storage sheets. The region corresponding to the image storage sheet is recognized by judging that a pixel in the read-out image, which pixel represents a color different from the color of the image storage sheet pushing surface of the platen cover, is a pixel falling within the region corresponding to the image storage sheet.

18 Claims, 22 Drawing Sheets

FOREIGN PATENT DOCUMENTS

| | | |
|---|---|---|
| JP | 10-177331 | 6/1998 |
| JP | 10-222688 | 8/1998 |
| JP | 11-24185 | 1/1999 |

OTHER PUBLICATIONS

Abstract 05-130337, May 25, 1993.
Abstract 05-134329, May 28, 1993.
Abstract 56-105579, Aug. 22, 1981.
Abstract 56-062274, May 28, 1981.
Abstract 02-131662, May 21, 1990.
Abstract 05-122466, May 18, 1993.
Abstract 10-177331, Jun. 30, 1998.
Abstract 11-024185, Jan. 29, 1999.
Abstract 05-110779, Apr. 30, 1993.

* cited by examiner

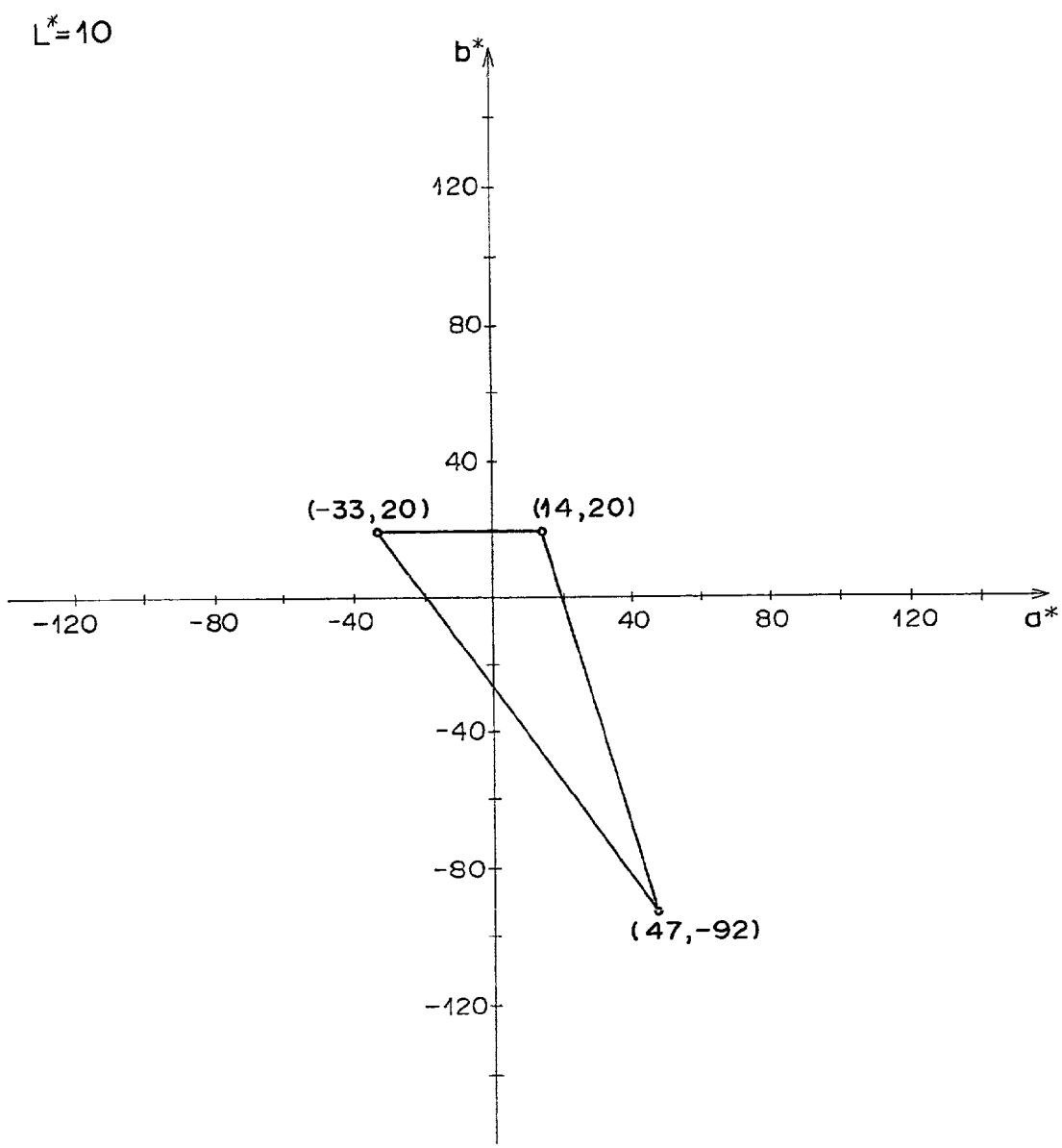
F I G. 21

METHOD AND APPARATUS FOR RECOGNIZING REGIONS CORRESPONDING TO IMAGE STORAGE SHEETS

BACKGROUND OF THE INVENTION

1. Field of the Invention

This invention relates to a method and apparatus for recognizing a region corresponding to an image storage sheet, which region is embedded in a read-out image. This invention also relates to an image processing method and apparatus for performing predetermined image processing on an image in the region having been recognized with the method of recognizing a region corresponding to an image storage sheet. This invention further relates to an apparatus for reading out an image from an image storage sheet, which apparatus is utilized for carrying out the method of recognizing a region corresponding to an image storage sheet. This invention still further relates to a platen cover and a sheet for a platen cover for use in the apparatus for reading out an image from an image storage sheet. This invention also relates to a recording medium, on which a program for causing a computer to execute the method of recognizing a region corresponding to an image storage sheet has been recorded and from which the computer is capable of reading the program.

2. Description of the Related Art

With the enhancement of performance of various digital printers and the reduction in cost of the digital printers made in recent years, there has arisen a tendency toward increased use of operations for reading out images, such as color images on color photoprints, which are formed with silver halide photographic materials, or images on color image storage sheets containing color images, with scanners (which are examples of apparatuses for reading out an image from an image storage sheet), and forming images in albums, or the like.

There have heretofore been proposed image processing techniques wherein, in cases where a plurality of different image storage sheets containing color images (e.g., color photoprints) are placed on a platen (i.e., an image storage sheet support base) and covered with a platen cover during an image read-out operation, the plurality of the images on the image storage sheets are read out with one time of scanning operation, thereafter positions, shapes, rotation angles, and the like, of the respective images are recognized automatically and corrected, and predetermined image processing is then performed.

One of image processing methods for the image processing techniques described above has been disclosed in, for example, Japanese Unexamined Patent Publication No. 10(1998)-222688. The disclosed image processing method comprises the steps of discriminating image objects (corresponding to areas of photoprints) in an input image, modeling a shape, which expresses each of boundaries of the image objects, into a predetermined shape, and characterizing the objects.

However, with the image processing method disclosed in Japanese Unexamined Patent Publication No. 10(1998)-222688, wherein the image objects are discriminated, the problems often occur in that, in cases where an image is read out from an image storage sheet containing a color image, error occurs with the discrimination of the region corresponding to the boundary of the image storage sheet.

In order for the error occurring with discrimination of the region corresponding to the boundary of the image storage sheet to be eliminated, it may be considered to utilize one of various known techniques for discriminating the boundary and the size of the object (i.e., the image storage sheet), from which the image has been read out with a scanner, or the like.

For example, methods of detecting a size of an image storage sheet by blackening an image storage sheet pushing surface of a platen cover of a scanner have been disclosed in, for example, Japanese Unexamined Patent Publication Nos. 5(1993)-130337 and 5(1993)-134329. Also, a method of detecting a size of an image storage sheet by making an image storage sheet pushing surface of a platen cover whiter or more black than the image storage sheet has been disclosed in, for example, Japanese Unexamined Patent Publication No. Japanese Unexamined Patent Publication No. 56(1981)-105579.

Further, methods of utilizing coloring agents on an image storage sheet pushing surface of a platen cover have been disclosed in, for example, Japanese Unexamined Patent Publication Nos. 56(1981)-22424, 56(1981)-62274, and 2(1990)-131662.

Furthermore, a method of detecting a size of an image storage sheet by forming a yellow area and a white area on an image storage sheet pushing surface of a platen cover has been disclosed in, for example, Japanese Unexamined Patent Publication No. 5(1993)-122466.

The aforesaid methods of detecting a size of an image storage sheet, wherein the image storage sheet pushing surface of the platen cover is colored (with a chromatic color or an achromatic color), is efficient for document image storage sheets whose substrates are white. However, the aforesaid methods of detecting a size of an image storage sheet have the problems in that, in cases where images are read out from image storage sheets containing color images having various colors, such as color photoprints, the color of the platen cover often coincides with the color at a certain area of the color image, and therefore error often occurs with the recognition of the region corresponding to the image storage sheet.

Accordingly, methods of detecting a region corresponding to an image storage sheet appropriately regardless of whether the image storage sheet contains or does not contain a color image have been proposed in, for example, Japanese Unexamined Patent Publication Nos. 8(1996)-139848, 10(1998)-177331, and 11(1999)-24185. With the methods proposed in Japanese Unexamined Patent Publication Nos. 8(1996)-139848, 10(1998)-177331, a light absorbing agent for absorbing light, which has wavelengths falling within a predetermined wavelength region in a non-visible region, is applied onto an image storage sheet pushing surface of a platen cover. With the method proposed in Japanese Unexamined Patent Publication No. 11(1999)-24185, a transparent fluorescent coating material for producing infrared fluorescence is applied onto an image storage sheet pushing surface of a platen cover. However, the proposed methods of detecting a region corresponding to an image storage sheet have the problems in that a detector for detecting light of the non-visible region, such as an infrared region, must be provided besides a detector for image readout, and therefore the cost cannot be kept low.

A method of detecting a region corresponding to an image storage sheet, wherein a regular pattern, such as a dot pattern of red, green, and blue three primary color dots having a diameter of, e.g., 0.2 mm to 5 mm, is periodically formed in a main scanning direction and a sub-scanning direction on an image storage sheet pushing surface of a platen cover, has been proposed in, for example, Japanese Unexamined Patent Publication No. 5(1993)-110779. However, with the proposed method of detecting a region corresponding to an image storage sheet, wherein the dot pattern is utilized, colors of pixels located between adjacent dots cannot be discriminated, and therefore there is the risk that error will occur in recognition when a peripheral edge area of the image storage sheet is detected or when a slight space between adjacent image storage sheets is detected.

SUMMARY OF THE INVENTION

The primary object of the present invention is to provide a method of recognizing a region corresponding to an image storage sheet, wherein a region corresponding to an image storage sheet containing a color image is capable of being recognized accurately.

Another object of the present invention is to provide an image processing method for performing predetermined image processing on an image in the region having been recognized with the method of recognizing a region corresponding to an image storage sheet.

A further object of the present invention is to provide an apparatus for carrying out the method of recognizing a region corresponding to an image storage sheet.

A still further object of the present invention is to provide an apparatus for carrying out the image processing method.

Another object of the present invention is to provide an apparatus for reading out an image from an image storage sheet, which apparatus is utilized for carrying out the method of recognizing a region corresponding to an image storage sheet.

A further object of the present invention is to provide a platen cover for use in the apparatus for reading out an image from an image storage sheet.

A still further object of the present invention is to provide a sheet for the platen cover.

Another object of the present invention is to provide a recording medium, on which a program for causing a computer to execute the method of recognizing a region corresponding to an image storage sheet has been recorded and from which the computer is capable of reading the program.

The present invention provides a first method of recognizing a region corresponding to an image storage sheet, comprising the steps of:

i) obtaining a read-out image, which has been acquired by covering an image storage sheet that contains a color image with an image storage sheet pushing surface of a platen cover and reading out an image of a region on the image storage sheet pushing surface of the platen cover, the region on the image storage sheet pushing surface containing the image storage sheet, and ii) recognizing a region corresponding to the image storage sheet in the read-out image, wherein the image storage sheet pushing surface of the platen cover has a color other than colors which are ordinarily contained in image storage sheets, and the region corresponding to the image storage sheet is recognized by judging that a pixel in the read-out image, which pixel represents a color different from the color of the image storage sheet pushing surface of the platen cover, is a pixel falling within the region corresponding to the image storage sheet.

The term "image storage sheet containing a color image" as used herein means the image storage sheet, which contains an image of a chromatic color at least at a certain area of the image storage sheet. Image storage sheets containing only the images of achromatic colors, such as white, gray, and black, are not included in the scope of the image storage sheet in the present invention.

The term "color other than colors which are ordinarily contained in image storage sheets" as used herein means the color, which is ordinarily (in almost all cases) not contained in a reproducible color range that is defined by colors employed for forming color images on image storage sheets, such as colors of couplers for photosensitive materials (in the cases of color photoprints) or colors of inks (in the cases of printer output images). The probability of the color being contained in image storage sheets need not necessarily be exactly equal to 0%. Specifically, the color other than colors which are ordinarily contained in image storage sheets may be a color such that a boundary of the region corresponding to the image storage sheet is capable of being recognized substantially with a probability close to 100% in accordance with the difference between the color of the image storage sheet pushing surface of the platen cover and the color on the image storage sheet.

Also, the color other than colors which are ordinarily contained in image storage sheets need not necessarily be limited to the color other than colors which are ordinarily contained in all of color images, such as the color images on color photoprints and the printer output images. Specifically, it is only necessary that the color other than colors which are ordinarily contained in image storage sheets be the color other than the colors which are ordinarily contained in images to be subjected to the image read-out operations. For example, in cases where color photoprints are to be placed on the platen and the images are to be read out from the color photoprints, it is sufficient for the image storage sheet pushing surface of the platen cover to have a color which is ordinarily not contained in the color photoprints.

In the first method of recognizing a region corresponding to an image storage sheet in accordance with the present invention, the region corresponding to the image storage sheet is recognized by judging that a pixel in the read-out image, which pixel represents a color different from the color of the image storage sheet pushing surface of the platen cover, is a pixel falling within the region corresponding to the image storage sheet. Specifically, the region corresponding to the image storage sheet is recognized in accordance with the difference between the color of the image storage sheet pushing surface of the platen cover and the color on the image storage sheet. In order for the judgment to be made, one of various known judgment techniques for recognizing a boundary of a region corresponding to an image storage sheet in a read-out image in accordance with a difference in color between the image storage sheet and an image storage sheet pushing surface may be employed.

In the first method of recognizing a region corresponding to an image storage sheet in accordance with the present invention, the image storage sheet should preferably be a color photoprint. In such cases, the color of the image storage sheet pushing surface of the platen cover should preferably be a color outside a chromaticity range, which chromaticity range is approximately circumscribed with one of the following regions on $L^*a^*b^*$ chromaticity diagrams illustrating chromaticity coordinates $(a^*,b^*)$:

(1) a quadrangular region surrounded by lines connecting points having chromaticity coordinates $(a^*,b^*)$ of $(-28,15)$, $(15,15)$, $(32,-43)$, and $(13,-43)$ as for a lightness of $L^*=5$, (2) a triangular region surrounded by lines connecting points having chromaticity coordinates $(a^*,b^*)$ of $(-33,20)$, $(14,20)$, and $(47,-92)$ as for a lightness of $L^*=10$, (3) a quadrangular region surrounded by lines connecting points having chromaticity coordinates (a*,b*) of (−37,20), (26,20), (54,−73), and (30,−75) as for a lightness of L*=15, (4) a quadrangular region surrounded by lines connecting points having chromaticity coordinates (a*,b*) of (−38,20), (35,26), (57,−68), and (17,−72) as for a lightness of L*=20, (5) a quadrangular region surrounded by lines connecting points having chromaticity coordinates (a*,b*) of (−46,26), (44,34), (62,−64), and (6,−70) as for a lightness of L*=25, (6) a quadrangular region surrounded by lines connecting points having chromaticity coordinates (a*,b*) of (−57,33), (53,43), (67, 57), and (0,−68) as for a lightness of L*=30, (7) a quadrangular region surrounded by lines connecting points having chromaticity coordinates (a*,b*) of (−62,40), (61,51), (73,−56), and (−17, 62) as for a lightness of L*=35, (8) a quadrangular region surrounded by lines connecting points having chromaticity coordinates (a*,b*) of (−68,47), (57,58), (82,−52), and (−51,−57) as for a lightness of L*=40, (9) a quadrangular region surrounded by lines connecting points having chromaticity coordinates (a*,b*) of (−63,54), (53,54), (56,−47), and (−50,−53) as for a lightness of L*=45,

(10) a quadrangular region surrounded by lines connecting points having chromaticity coordinates (a*,b*) of (−50, 63), (46,71), (72,−45), and (−60,−48) as for a lightness of L*=50,

(11) a quadrangular region surrounded by lines connecting points having chromaticity coordinates (a*,b*) of (−43, 71), (39,76), (63,−41), and (−56,−44) as for a lightness of L*=55,

(12) a quadrangular region surrounded by lines connecting points having chromaticity coordinates (a*,b*) of (−33, 80), (31,85), (55,−36), and (−54,−39) as for a lightness of L*=60,

(13) a quadrangular region surrounded by lines connecting points having chromaticity coordinates (a*,b*) of (−22, 91), (24,91), (47,−32), and (−49,−34) as for a lightness of L*=65,

(14) a quadrangular region surrounded by lines connecting points having chromaticity coordinates (a*,b*) of (−11, 98), (17,98), (40,−27), and (−46,−27) as for a lightness of L*=70,

(15) a quadrangular region surrounded by lines connecting points having chromaticity coordinates (a*,b*) of (−5, 122), (6,123), (29,−23), and (−41,−23) as for a lightness of L*=75,

(16) a quadrangular region surrounded by lines connecting points having chromaticity coordinates (a*,b*) of (−6, 103), (5,103), (22,−17), and (−28,−17) as for a lightness of L*=80,

(17) a quadrangular region surrounded by lines connecting points having chromaticity coordinates (a*,b*) of (−7, 69), (4,70), (19,−15), and (−17,−15) as for a lightness of L*=85, and

(18) a quadrangular region surrounded by lines connecting points having chromaticity coordinates (a*,b*) of (−4, 48), (7,48), (15,−12), and (−12,−12) as for a lightness of L*=90.

In cases where a color having chromaticity coordinates (a*,b*), which are remote outwardly from the boundary of each of the chromaticity ranges described above, is employed as the color of the image storage sheet pushing surface of the platen cover, the difference between the color on the image storage sheet and the color of the image storage sheet pushing surface becomes large, and therefore the recognition accuracy is capable of being enhanced.

Examples of the colors outside the chromaticity ranges described above include yellow and blue, which are comparatively bright (i.e., which have a comparatively high lightness L*).

The chromaticity ranges described above have been determined in accordance with results of measurements of color development ranges of color photoprints, which are of various types (including differences of suppliers) and are ordinarily commercially available at present, the measurements being made with a chromoscope. In cases where new photosensitive materials become available and the color development ranges are extended in the future, the chromaticity ranges described above may be extended in accordance with the extended color development ranges. Also, in the fist method of recognizing a region corresponding to an image storage sheet in accordance with the present invention, extended chromaticity ranges, which are obtained by extending the chromaticity ranges described above to a predetermined extent, may be set, and a color outside the extended chromaticity ranges may be employed as the color of the image storage sheet pushing surface of the platen cover. In such cases, the first method of recognizing a region corresponding to an image storage sheet is capable of coping with the occurrence of new photosensitive materials without the necessity of altering the color of the image storage sheet pushing surface.

In cases where the image storage sheet is the one other than the color photoprints, as in the cases of a sheet carrying a printer output image, chromaticity ranges defined on the L*a*b* chromaticity diagrams may be set in the manner described above in accordance with the color reproducible range, which is defined by characteristics of inks utilized for outputting printer output images, or the like. Also, a color outside the thus set chromaticity ranges may be employed as the color of the image storage sheet pushing surface of the platen cover.

The present invention also provides a second method of recognizing a region corresponding to an image storage sheet, comprising the steps of:

i) obtaining a read-out image, which has been acquired by covering an image storage sheet that contains a color image with an image storage sheet pushing surface of a platen cover and reading out an image of a region on the image storage sheet pushing surface of the platen cover, the region on the image storage sheet pushing surface containing the image storage sheet, and ii) recognizing a region corresponding to the image storage sheet in the read-out image, wherein the image storage sheet pushing surface of the platen cover has a periodical pattern (i.e., a periodical color pattern), which is composed of a plurality of different color areas arrayed in a predetermined order and in abutment with one another, and the region corresponding to the image storage sheet is recognized by judging that a pixel in the read-out image, which pixel represents an image different from the periodical pattern, is a pixel falling within the region corresponding to the image storage sheet.

The term "a plurality of different color areas arrayed in a predetermined order and in abutment with one another" as used herein means that the plurality of the areas of different colors are arrayed in an order, which ordinarily does not occur in color images on image storage sheets, and in abutment with one another without leaving any space. The color array pattern, in which the plurality of the different color areas are arrayed in the predetermined order and in abutment with one another, may be selected from various color array patterns, in which a plurality of different color areas are arrayed in the order that ordinarily does not occur in color images on image storage sheets. For example, at certain areas in the color array pattern, areas of the same color may abut with each other. Also, the colors employed in the color array pattern are not limited to the "colors other than colors which are ordinarily contained in image storage sheets" as in the first method of recognizing a region corresponding to an image storage sheet in accordance with the present invention. The colors employed in the color array pattern may be identical with the colors which are ordinarily contained in color images. However, in cases where the "colors other than colors which are ordinarily contained in image storage sheets" are employed in the color array pattern, the recognition accuracy is capable of being enhanced even further.

In the second method of recognizing a region corresponding to an image storage sheet in accordance with the present invention, a size of each of the color areas in the periodical pattern should preferably fall within the range of 0.1 mm square to 1 mm square, and should more preferably fall within the range of 0.15 mm square to 0.75 mm square.

Also, in the second method of recognizing a region corresponding to an image storage sheet in accordance with the present invention, in cases where the periodical pattern is a two-color array pattern, one period in the periodical pattern should preferably fall within the range of a value two times as large as a spatial resolving power of the read-out image to a value 20 times as large as the spatial resolving power of the read-out image. One period in the periodical pattern should more preferably fall within the range of a value two times as large as the spatial resolving power of the read-out image to a value 10 times as large as the spatial resolving power of the read-out image, and should most preferably fall within the range of a value two times as large as the spatial resolving power of the read-out image to a value five times as large as the spatial resolving power of the read-out image. (In cases where the periodical pattern is an N-color array pattern, the value two times as large as the spatial resolving power of the read-out image described above is replaced by a value N times as large as the spatial resolving power of the read-out image, provided that the value does not amount to 20 times, 10 times, or five times.)

The term "spatial resolving power of a read-out image" as used herein means the resolving power (i.e., the resolution) which is defined by the read-out density (i.e., the spatial sub-sampling density) of the apparatus for reading out the image from the image storage sheet.

The present invention further provides an image processing method, comprising the step of modeling a shape, which expresses boundaries of a region having been recognized as the region corresponding to the image storage sheet with the first or second method of recognizing a region corresponding to an image storage sheet in accordance with the present invention, into a predetermined shape.

In the image processing method in accordance with the present invention, the shape, which expresses the boundaries of the region having been recognized as the region corresponding to the image storage sheet, is modeled into a predetermined shape. Specifically, the boundaries of the region corresponding to the image storage sheet, which have been detected by utilizing an edge tracing technique, or the like, is modeled into a predetermined shape, such as a rectangle, a triangle, or a star-like shape. At this time, processing for removing an area corresponding to a margin (i.e., a white frame area) of the color photoprint, trimming processing, or the like, may be performed simultaneously with the modeling processing.

Also, the image processing method in accordance with the present invention should preferably be modified such that an image of the region, which has been modeled into the predetermined shape, is located within a frame of a template, which has been prepared previously, and a template-appended image is thereby formed.

The present invention still further provides an apparatus for carrying out the first method of recognizing a region corresponding to an image storage sheet in accordance with the present invention. Specifically, the present invention still further provides a first apparatus for recognizing a region corresponding to an image storage sheet, comprising:

i) means for obtaining a read-out image, which has been acquired by covering an image storage sheet that contains a color image with an image storage sheet pushing surface of a platen cover and reading out an image of a region on the image storage sheet pushing surface of the platen cover, the region on the image storage sheet pushing surface containing the image storage sheet, and ii) recognition means for recognizing a region corresponding to the image storage sheet in the read-out image, wherein the read-out image is an image having been read out by utilizing the platen cover provided with the image storage sheet pushing surface having a color other than colors which are ordinarily contained in image storage sheets, and the recognition means recognizes the region corresponding to the image storage sheet by judging that a pixel in the read-out image, which pixel represents a color different from the color of the image storage sheet pushing surface of the platen cover, is a pixel falling within the region corresponding to the image storage sheet.

The present invention also provides an apparatus for carrying out the second method of recognizing a region corresponding to an image storage sheet in accordance with the present invention. Specifically, the present invention also provides a second apparatus for recognizing a region corresponding to an image storage sheet, comprising:

i) means for obtaining a read-out image, which has been acquired by covering an image storage sheet that contains a color image with an image storage sheet pushing surface of a platen cover and reading out an image of a region on the image storage sheet pushing surface of the platen cover, the region on the image storage sheet pushing surface containing the image storage sheet, and ii) recognition means for recognizing a region corresponding to the image storage sheet in the read-out image, wherein the read-out image is an image having been read out by utilizing the platen cover provided with the image storage sheet pushing surface having a periodical pattern, which is composed of a plurality of different color areas arrayed in a predetermined order and in abutment with one another, and the recognition means recognizes the region corresponding to the image storage sheet by judging that a pixel in the read-out image, which pixel represents an image different from the periodical pattern, is a pixel falling within the region corresponding to the image storage sheet.

The present invention further provides an image processing apparatus, comprising modeling means for modeling a shape, which expresses boundaries of a region having been recognized as the region corresponding to the image storage sheet with the first or second apparatus for recognizing a region corresponding to an image storage sheet in accordance with the present invention, into a predetermined shape.

The image processing apparatus in accordance with the present invention should preferably further comprise image forming means for locating an image of the region, which has been modeled by the modeling means into the predetermined shape, within a frame of a template, which has been prepared previously, and thereby forming a template-appended image.

The present invention still further provides a first platen cover for use in an apparatus for reading out an image from an image storage sheet, the platen cover comprising an image storage sheet pushing surface having a color other than colors which are ordinarily contained in image storage sheets containing color images (as in the first method of recognizing a region corresponding to an image storage sheet in accordance with the present invention).

The present invention also provides a second platen cover for use in an apparatus for reading out an image from an image storage sheet, the platen cover comprising an image storage sheet pushing surface having a color outside a chromaticity range, which chromaticity range is approximately circumscribed with one of the regions on L*a*b* chromaticity diagrams illustrating chromaticity coordinates (a*,b*), the regions having been described above with reference to the first method of recognizing a region corresponding to an image storage sheet in accordance with the present invention.

The present invention further provides a third platen cover for use in an apparatus for reading out an image from an image storage sheet, the platen cover comprising an image storage sheet pushing surface having a periodical pattern, which is composed of a plurality of different color areas arrayed in a predetermined order and in abutment with one another (as in the second method of recognizing a region corresponding to an image storage sheet in accordance with the present invention).

The present invention still further provides a first sheet for a platen cover, wherein one of opposite surfaces of the sheet has a color other than colors which are ordinarily contained in image storage sheets containing color images (as in the first method of recognizing a region corresponding to an image storage sheet in accordance with the present invention).

The present invention also provides a second sheet for a platen cover, wherein one of opposite surfaces of the sheet has a color outside a chromaticity range, which chromaticity range is approximately circumscribed with one of the regions on L*a*b* chromaticity diagrams illustrating chromaticity coordinates (a*,b*), the regions having been described above with reference to the first method of recognizing a region corresponding to an image storage sheet in accordance with the present invention.

The present invention further provides a third sheet for a platen cover, wherein one of opposite surfaces of the sheet has a periodical pattern, which is composed of a plurality of different color areas arrayed in a predetermined order and in abutment with one another (as in the second method of recognizing a region corresponding to an image storage sheet in accordance with the present invention).

Each of the first, second, and third sheets for a platen cover in accordance with the present invention is fitted to the side of the image storage sheet pushing surface of the platen cover. The other surface of each of the first, second, and third sheets for a platen cover in accordance with the present invention should preferably be provided with means (e.g., an adhesive tape) for releasably fitting the sheet to the side of the image storage sheet pushing surface of the platen cover.

The present invention still further provides an apparatus for reading out an image from an image storage sheet, wherein the improvement comprises the provision of the first, second, or third platen cover in accordance with the present invention (or the first, second, or third sheet for a platen cover in accordance with the present invention).

The present invention also provides a first recording medium, on which a program for causing a computer to execute a method of recognizing a region corresponding to an image storage sheet has been recorded and from which the computer is capable of reading the program, wherein the program comprises the procedures for:

i) obtaining a read-out image, which has been read out by the apparatus for reading out an image from an image storage sheet in accordance with the present invention provided with the first or second platen cover in accordance with the present invention, and ii) recognizing the region corresponding to the image storage sheet by judging that a pixel in the read-out image, which pixel represents a color different from the color of the image storage sheet pushing surface of the platen cover, is a pixel falling within the region corresponding to the image storage sheet.

The present invention further provides a second recording medium, on which a program for causing a computer to execute a method of recognizing a region corresponding to an image storage sheet has been recorded and from which the computer is capable of reading the program, wherein the program comprises the procedures for:

i) obtaining a read-out image, which has been read out by the apparatus for reading out an image from an image storage sheet in accordance with the present invention provided with the third platen cover in accordance with the present invention, and ii) recognizing the region corresponding to the image storage sheet by judging that a pixel in the read-out image, which pixel represents an image different from the periodical pattern, is a pixel falling within the region corresponding to the image storage sheet.

With the first method and apparatus for recognizing a region corresponding to an image storage sheet in accordance with the present invention, the platen cover is provided with the image storage sheet pushing surface having a color other than colors which are ordinarily contained in image storage sheets (e.g. in cases where the image storage sheet is the color photoprint, the image storage sheet pushing surface having a color outside the chromaticity ranges described above). Therefore, the probability that the color of the image storage sheet pushing surface and the color on the image storage sheet will be identical with each other is markedly low. Accordingly, in cases where the recognition of the region corresponding to the image storage sheet is performed in accordance with the difference between the color of the image storage sheet pushing surface and the color on the image storage sheet, i.e. in cases where the region corresponding to the image storage sheet is recognized by judging that a pixel in the read-out image, which pixel represents a color different from the color of the image storage sheet pushing surface of the platen cover, is a pixel falling within the region corresponding to the image storage sheet, the possibility that a pixel in the region corresponding to the image storage sheet will be recognized by mistake as a pixel in the region corresponding to the image storage sheet pushing surface becomes markedly low. As a result, the accuracy of recognition is capable of being enhanced markedly. In this manner, for example, in cases where images on a plurality of color photoprints are read out simultaneously with a scanner, the region corresponding to each of the color photoprints is capable of being detected accurately, and image processing on the images on the color photoprints is capable of being performed automatically.

With the second method and apparatus for recognizing a region corresponding to an image storage sheet in accordance with the present invention, the platen cover is provided with the image storage sheet pushing surface having a periodical color pattern, which is composed of a plurality of different color areas arrayed in a predetermined order and in abutment with one another. Therefore, the probability that the same periodical color pattern will occur on the image storage sheet is markedly low. Accordingly, as in the first method and apparatus for recognizing a region corresponding to an image storage in accordance with the present invention sheet, in cases where recognition of the region corresponding to the image storage sheet is performed in accordance with the difference in color pattern, the possibility that a pixel in the region corresponding to the image storage sheet will be recognized by mistake as a pixel in the region corresponding to the image storage sheet pushing surface becomes markedly low. As a result, the accuracy of recognition is capable of being enhanced markedly.

Also, with the second method and apparatus for recognizing a region corresponding to an image storage sheet in accordance with the present invention, wherein the size of each of the color areas in the periodical pattern falls within the range of 0.1 mm square to 1 mm square, or wherein one period in the periodical pattern falls within the range of a value two times as large as the spatial resolving power of the read-out image to a value 20 times as large as the spatial resolving power of the read-out image, the recognition of the region corresponding to the image storage sheet is capable of being performed more accurately.

Further, with the first method and apparatus for recognizing a region corresponding to an image storage sheet and the second method and apparatus for recognizing a region corresponding to an image storage sheet in accordance with the present invention, the image storage sheet pushing surface of the platen cover has the predetermined color or the predetermined periodical pattern described above, and the recognition of the region corresponding to the image storage sheet is performed in accordance with the difference in color or color pattern between the image storage sheet and the image storage sheet pushing surface. Therefore, a particular detector need not be provided, and the cost of the apparatus for recognizing a region corresponding to an image storage sheet is capable of being kept low.

With the platen covers, the sheets for a platen cover, or the recording media in accordance with the present invention, in cases where problems occur with the recognition of the region corresponding to the image storage sheet, which recognition is made with an originally purchased apparatus for reading out an image from an image storage sheet (other than the apparatuses for reading out an image from an image storage sheet in accordance with the present invention) or originally purchased application software functions for region recognition (other than the programs recorded on the recording media in accordance with the present invention), alteration is capable of being made easily by changing over the platen cover to one of the platen covers in accordance with the present invention or fitting one of the sheets for a platen cover in accordance with the present invention to the image storage sheet pushing surface of the platen cover, causing the computer to read the program from one of the recording media in accordance with the present invention, and thereby performing the recognition of the region corresponding to the image storage sheet. Specifically, the existing systems are capable of being altered easily to a system for region recognition in accordance with the present invention.

With the image processing method and apparatus in accordance with the present invention, the processing described above is performed on the region, which has been recognized as the region corresponding to the image storage sheet with one of the methods of recognizing a region corresponding to an image storage sheet in accordance with the present invention. Therefore, the processing is capable of being performed more easily and more accurately than with the conventional techniques.

BRIEF DESCRIPTION OF THE DRAWINGS

FIG. 21 is an L*a*b* chromaticity diagram illustrating chromaticity coordinates (a*,b*), the diagram showing an example of a color range of the first embodiment of the sheet for a platen cover in accordance with the present invention as for a lightness of L*=10.

DESCRIPTION OF THE PREFERRED EMBODIMENTS

The present invention will hereinbelow be described in further detail with reference to the accompanying drawings.

Figure 1:
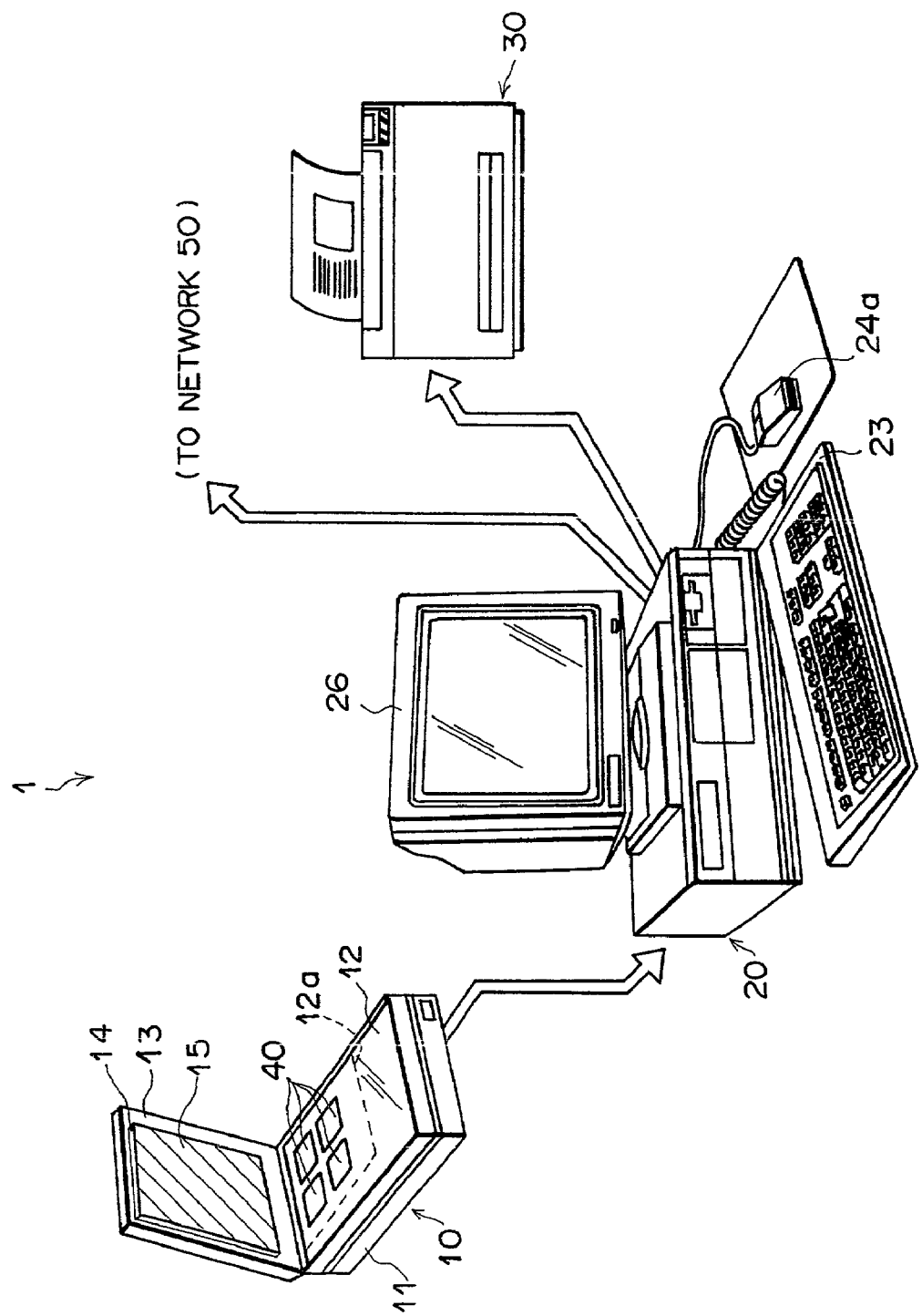
FIG. 1 is a schematic view showing an image processing system, in which an embodiment of the image processing method in accordance with the present invention is employed.
Figure 2:
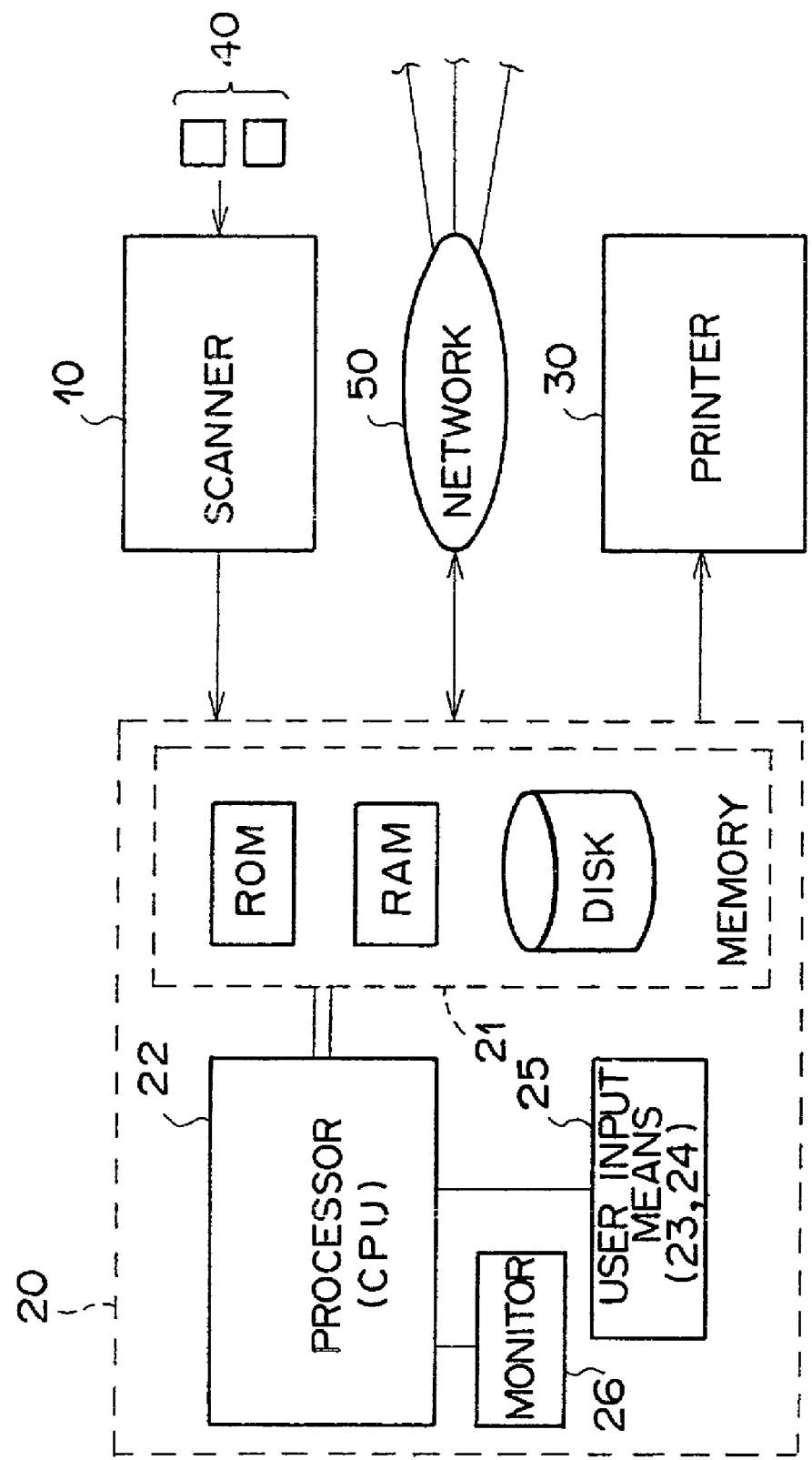
FIG. 2 is a block diagram showing the image processing system and functions of a personal computer.

FIG. 1 is a schematic view showing an image processing system, in which an embodiment of the image processing method in accordance with the present invention is employed. FIG. 2 is a block diagram showing the image processing system and functions of a personal computer.

As illustrated in FIG. 1 and FIG. 2, an image processing system 1 comprises a scanner 10 acting as the apparatus for reading out an image from an image storage sheet containing a color image. The image processing system 1 also comprises a personal computer 20 acting as the apparatus for recognizing a region corresponding to an image storage sheet and the image processing apparatus for performing predetermined processing on image signals, which have been obtained from an image read-out operation performed by the scanner 10. The image processing system 1 further comprises a printer 30 acting as an image output device for outputting a visible image in accordance with processed image signals, which have been received from the personal computer 20.

The scanner 10 comprises a main body 11 and a platen 12, which is constituted of transparent glass and is formed on the main body 11. The scanner 10 also comprises a platen cover 13 for pushing image storage sheets 40, 40, . . . , which contain color images and are placed on the platen 12, against the platen 12. The scanner 10 further comprises a scanning read-out-section (not shown), which is provided with a light source and a detector. The image storage sheets 40, 40, . . . are located within a predetermined read-out region (surrounded by a broken line 12a in FIG. 1) on the platen 12, such that image surfaces of the image storage sheets 40, 40, . . . stand facing the platen 12. The thus located image storage sheets 40, 40, . . . are pushed by the platen cover 13 against a top surface of the platen 12 and are thus kept stationary. The scanning read-out section is located within the main body 11 under the platen 12 in order to optically read out the images having been recorded on the image storage sheets 40, 40, . . . .

The platen cover 13 has an image storage sheet pushing surface 13a, which stands facing the platen 12. The image storage sheet pushing surface 13a is provided with a structure member 14, which may be constituted of a sponge, or the like. The structure member 14 acts such that the platen cover 13 can come into close contact with the platen 12 at areas outside of the image storage sheets 40, 40, . . . . A colored sheet 15 is releasably fitted to the surface of the structure member 14.

The colored sheet 15 acts such that the personal computer 20 is capable of recognizing a background image, which is formed on the side outward from the image storage sheets 40, 40, . . . , as an image outside the color image regions, extracting image signal components corresponding to the color image regions, and performing desired image processing on the image signal components corresponding to the color image regions. In this embodiment, the colored sheet 15 has a predetermined color over the entire area or on an area having been set to match with a specified read-out region size, or in a predetermined color array pattern. The color ranges and the kinds of compounds, which may be utilized for the coloring of the colored sheet 15, will be described later.

The personal computer 20 comprises a memory (i.e., a storage device) 21 for storing digital image signals, which have been acquired with the scanner 10, such that the images can be accessed successively. The memory 21 may be constituted of a RAM, a ROM, a magnetic disk, or the like. The memory 21 contains a program memory for storing object codes for giving instructions for causing a processor 22 to execute the method of recognizing a region corresponding to an image storage sheet and the image processing method in accordance with the present invention. The personal computer 20 also comprises user input means 25 and a monitor 26 for image display as user interface means. The user input means 25 comprises a keyboard 23 and a pointing device 24. The pointing device 24 is constituted of a mouse device 24a, a keypad, a track ball, a stylus, or the like.

The personal computer 20 receives the image signals from the scanner 10, which image signals have been obtained with a single, simultaneous readout of the images having been recorded on a plurality of color photoprints acting as the image storage sheets 40, 40, . . . placed randomly on the platen 12 of the scanner 10. The personal computer 20 has functions for automatically discriminating the region corresponding to each of the color photoprints in accordance with the received image signals and modeling the shape of the region corresponding to each of the color photoprints. No limitation is imposed on the sizes of the color photoprints. In many cases, by way of example, the size of prints with an instant camera supplied by Fuji Photo Film Co., Ltd., the size of Cheki (trade name) supplied by Fuji Photo Film Co., Ltd., or the L size of ordinarily utilized color photoprints is employed. The plurality of the color photoprints should preferably be located on the platen 12 of the scanner 10 such that they may not overlap one upon another.

The personal computer 20 has the functions such that, even if the positions, the orientations, or the angles of the color photoprints on the platen 12 are deviated, the personal computer 20 can automatically discriminate the regions corresponding to the image storage sheets 40, 40, . . . and can automatically perform position matching (including the orientation matching and the angle matching). Also, the personal computer 20 has the functions for performing desired image processing on each of the images in the recognized regions corresponding to the color photoprints. The personal computer 20 further has the functions for fitting the image signal components of the processed image signals, which image signal components represent each of the images, into an area within a predetermined frame in a template having been prepared previously, and thereby forming template-appended image signals for print output. (Alternatively, the image processing may be performed after the image signal components representing each of the images having not been processed are fitted into the area within the predetermined frame in the template.) The personal computer 20 still further has the functions for feeding the template-appended image signals into the printer 30 or a network 50.

Figure 3:
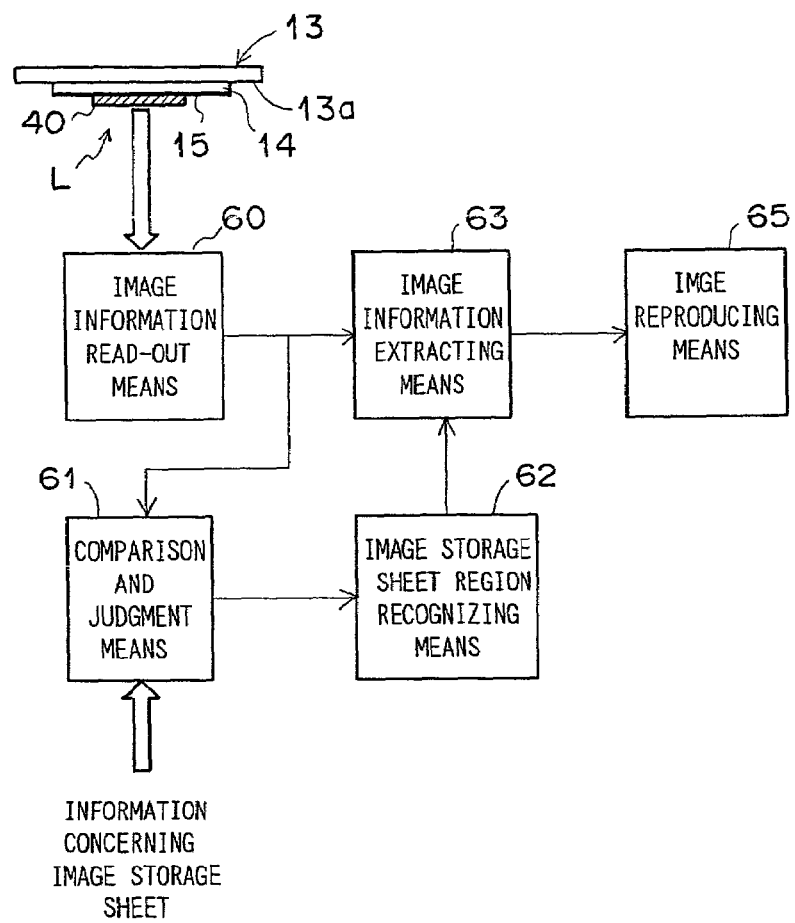
FIG. 3 is a block diagram showing functions of the image processing system, in which the embodiment of the image processing method in accordance with the present invention is employed.

FIG. 3 is a block diagram showing functions of the image processing system 1 for recognizing the region corresponding to each image storage sheet in accordance with reflected light of light, which has been irradiated to the image storage sheets 40, 40, . . . and the colored sheet 15 fitted to the platen cover 13.

As illustrated in FIG. 3, the image processing system 1 comprises image information read-out means 60, comparison and judgment means 61, image storage sheet region recognizing means 62, image information extracting means 63, and image reproducing means 65. The functions of the scanner 10 act as the image information read-out means 60. The functions of the personal computer 20 act as the comparison and judgment means 61, the image storage sheet region recognizing means 62, and the image information extracting means 63. The functions of the printer 30 act as the image reproducing means 65.

The image information read-out means 60 optically detects light, which is reflected from the colored sheet 15 fitted to the platen cover 13 and from the image storage sheets 40, 40, . . . . In this manner, the image information read-out means 60 forms color image signals representing the image within the read-out region 12a containing the image storage sheets 40, 40, . . . . The comparison and judgment means 61 compares the color of each of pixels, which are represented by image signal components of the color image signals received from the image information read-out means 60, and the color of the colored sheet 15 with each other. Also, the comparison and judgment means 61 makes a judgment as to whether a pixel of the same color as the color of the colored sheet 15 has or has not been detected (in the cases of a first embodiment of the colored sheet 15, which will be described later), or as to whether areas of predetermined colors are iterated with a predetermined period (in the cases of a second embodiment of the colored sheet 15, which will be described later).

In cases where it has been judged by the comparison and judgment means 61 that the color of a pixel represented by image signal components of the color image signals is identical with the color of the colored sheet 15 (in the cases of the first embodiment of the colored sheet 15), or in cases where it has been judged by the comparison and judgment means 61 that the areas of the predetermined colors are iterated with the predetermined period (in the cases of the second embodiment of the colored sheet 15), the image storage sheet region recognizing means 62 recognizes that the pixel associated with the judgment is not a pixel falling within the region corresponding to the image storage sheet. Also, in cases where it has been judged by the comparison and judgment means 61 that the color of a pixel represented by image signal components of the color image signals is different from the color of the colored sheet 15 (in the cases of the first embodiment of the colored sheet 15), or in cases where it has been judged by the comparison and judgment means 61 that the areas of the predetermined colors are not iterated with the predetermined period (in the cases of the second embodiment of the colored sheet 15), the image storage sheet region recognizing means 62 recognizes that the pixel associated with the judgment is a pixel falling within the region corresponding to the image storage sheet. In this manner, the image storage sheet region recognizing means 62 performs the processing for discriminating the region corresponding to the image storage sheet and the background region from each other, and detects image objects (i.e., the regions corresponding to the image storage sheets).

The image information extracting means 63 selectively extracts only the image signal components, which correspond to each of the regions having been recognized by the image storage sheet region recognizing means 62 as the regions corresponding to the image storage sheets, (i.e., only the image signal components representing each of the image objects) from the color image signals having been received from the image information read-out means 60. Also, the image information extracting means 63 performs desired image processing on the thus extracted image signal components and feeds the processed image signal components into the image reproducing means 65 or the network 50.

Figure 4:
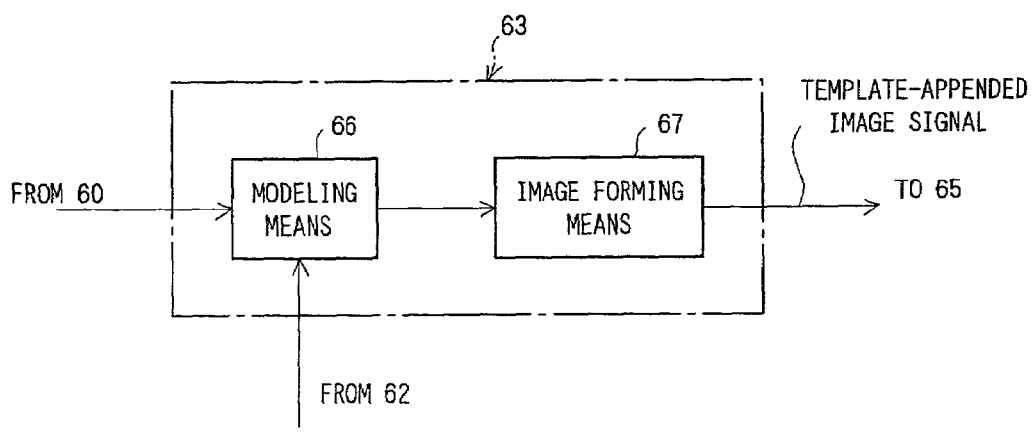
FIG. 4 is a block diagram showing an example of image information extracting means.
Figure 5:
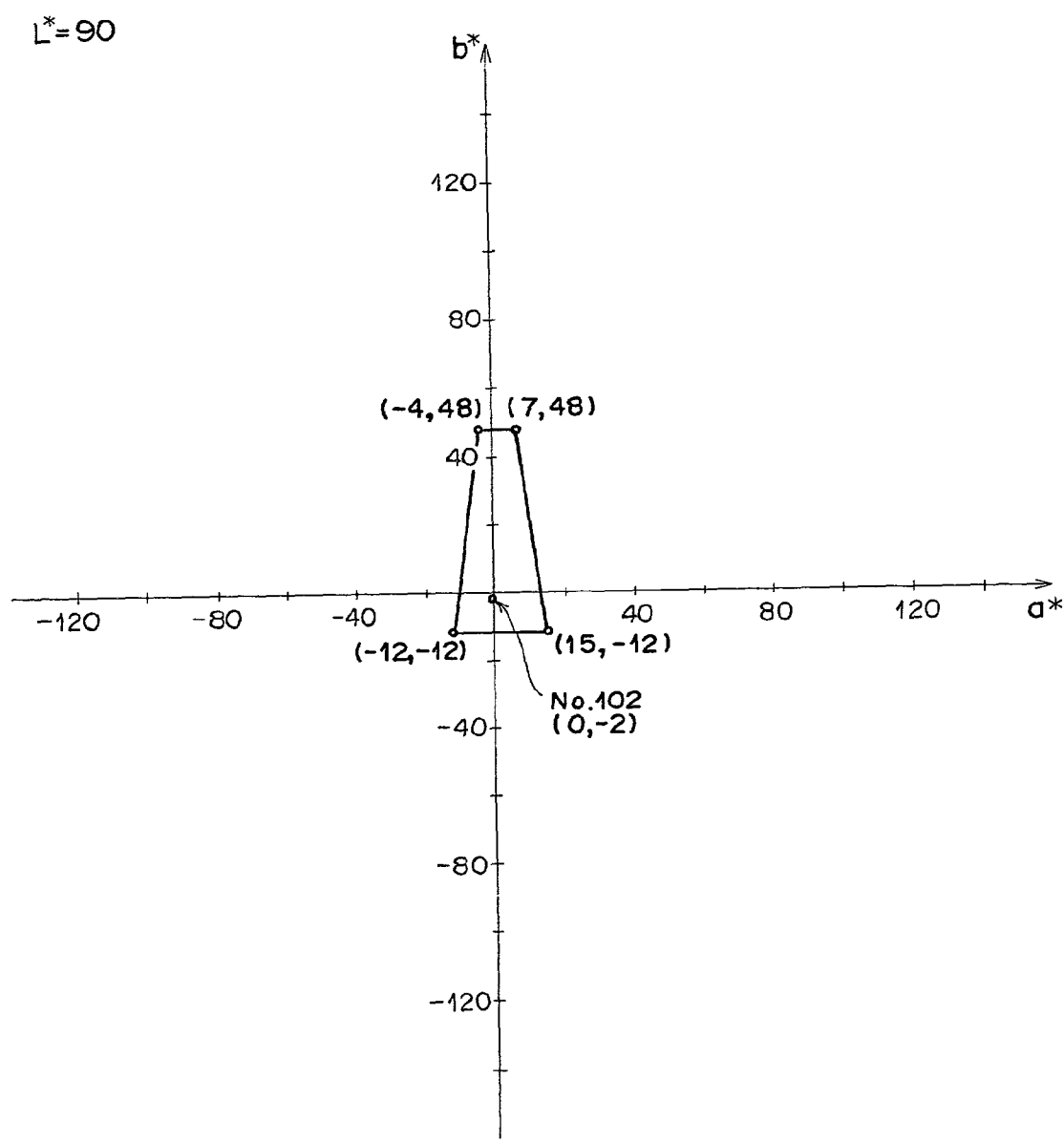
FIG. 5 is an L*a*b* chromaticity diagram illustrating chromaticity coordinates (a*,b*), the diagram showing an example of a color range of a first embodiment of the sheet for a platen cover in accordance with the present invention as for a lightness of L*=90.
Figure 6:
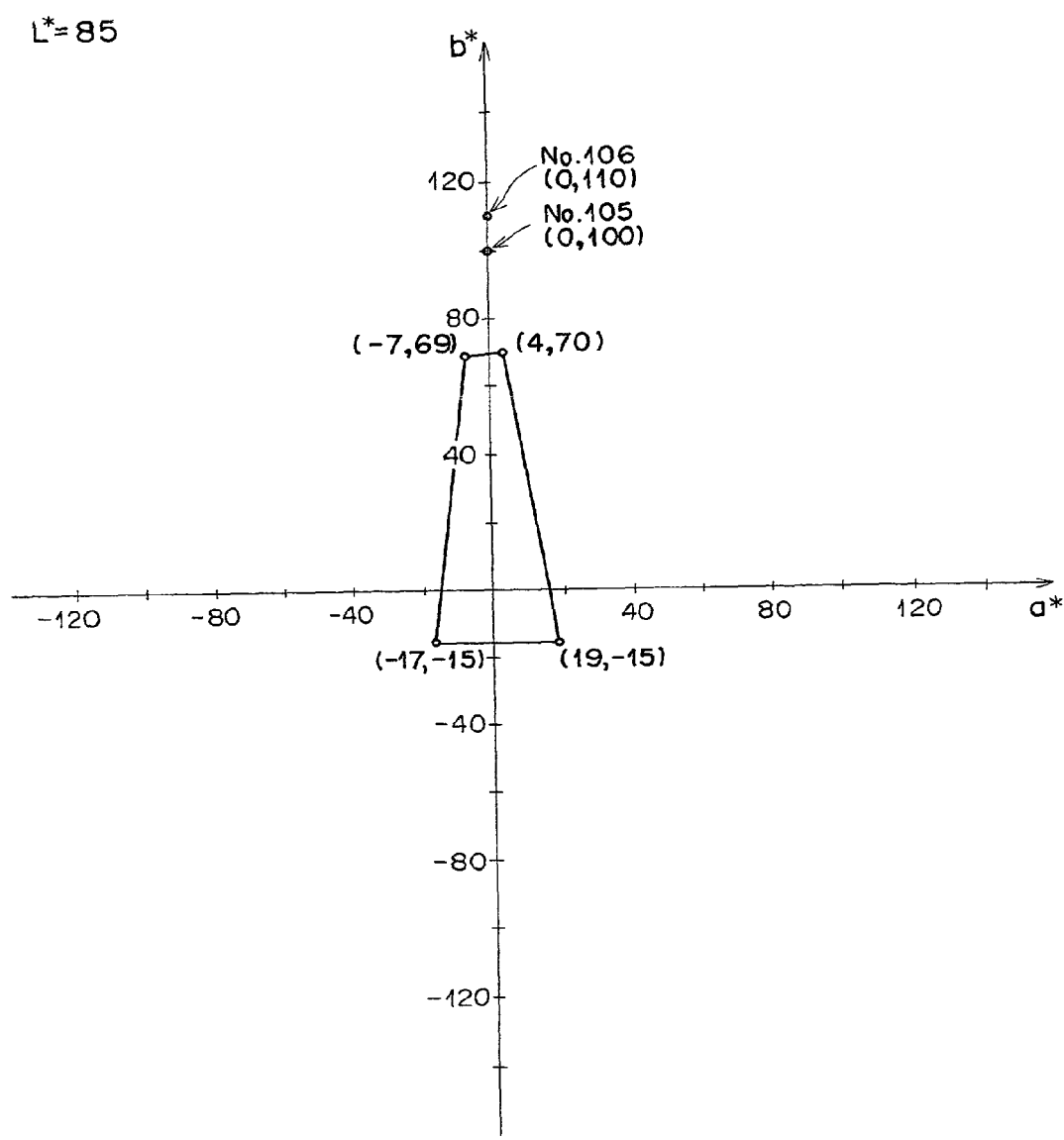
FIG. 6 is an L*a*b* chromaticity diagram illustrating chromaticity coordinates (a*,b*), the diagram showing an example of a color range of the first embodiment of the sheet for a platen cover in accordance with the present invention as for a lightness of L*=85.
Figure 7:
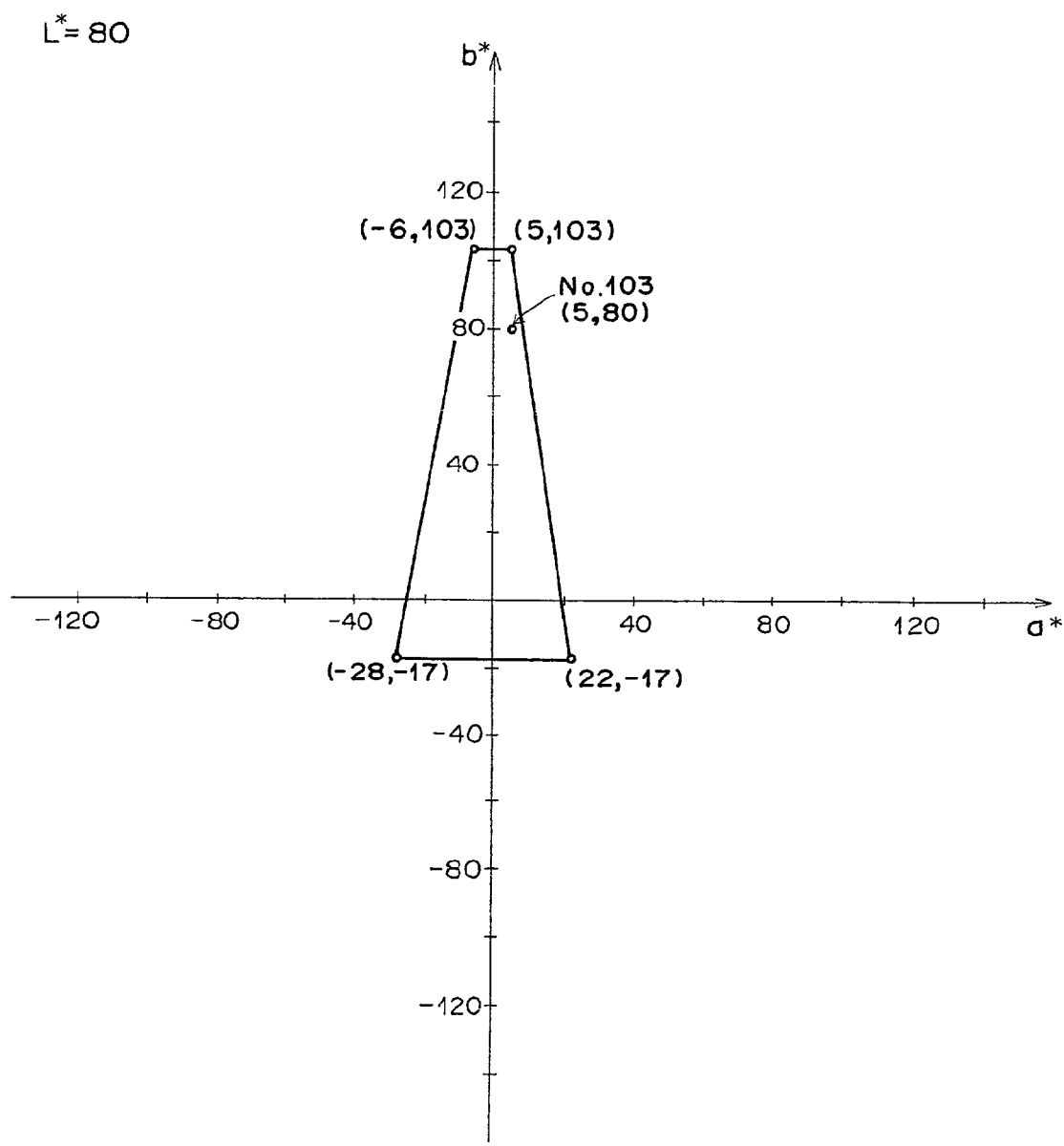
FIG. 7 is an L*a*b* chromaticity diagram illustrating chromaticity coordinates (a*,b*), the diagram showing an example of a color range of the first embodiment of the sheet for a platen cover in accordance with the present invention as for a lightness of L*=80.
Figure 8:
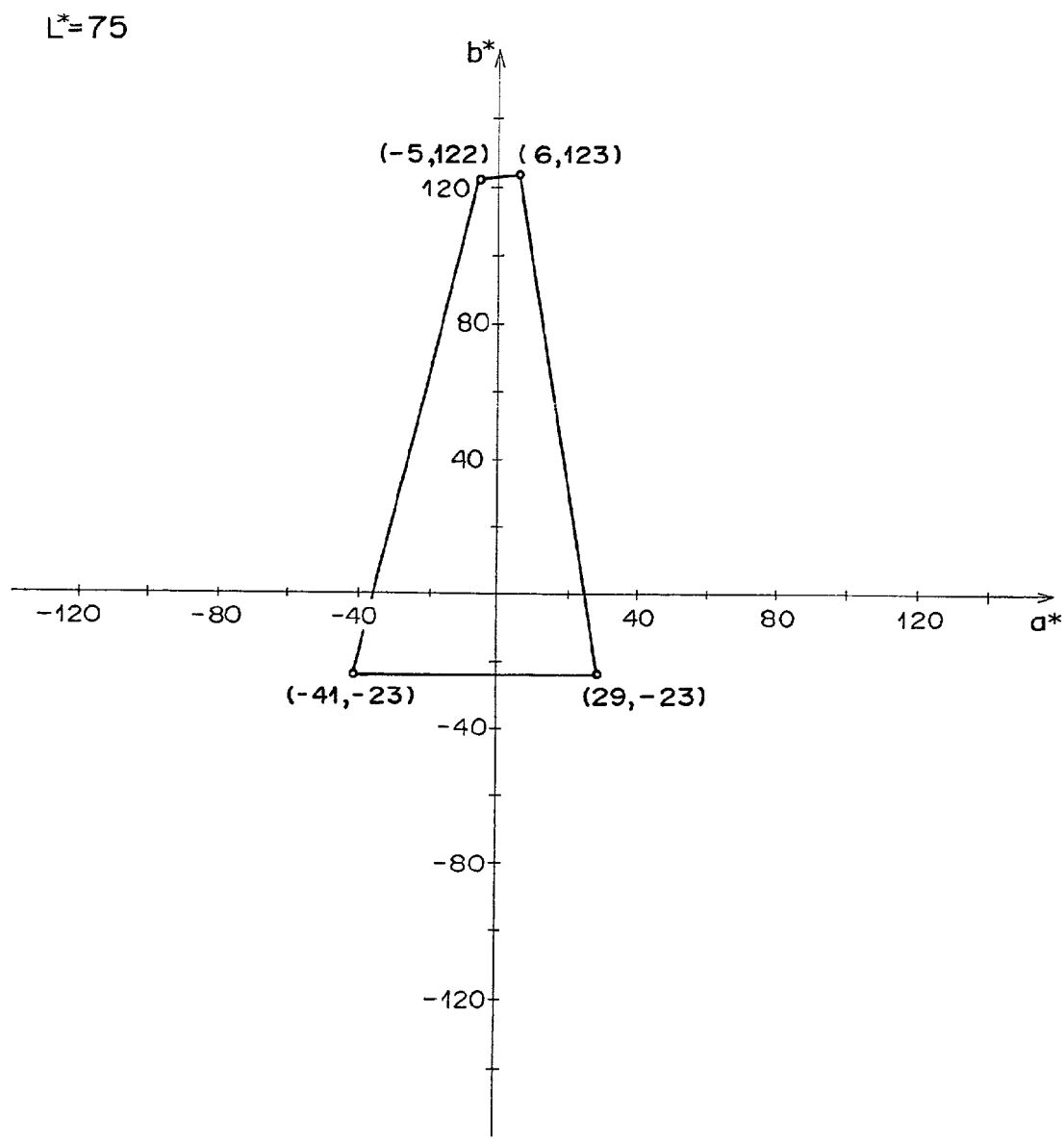
FIG. 8 is an L*a*b* chromaticity diagram illustrating chromaticity coordinates (a*,b*), the diagram showing an example of a color range of the first embodiment of the sheet for a platen cover in accordance with the present invention as for a lightness of L*=75.
Figure 9:
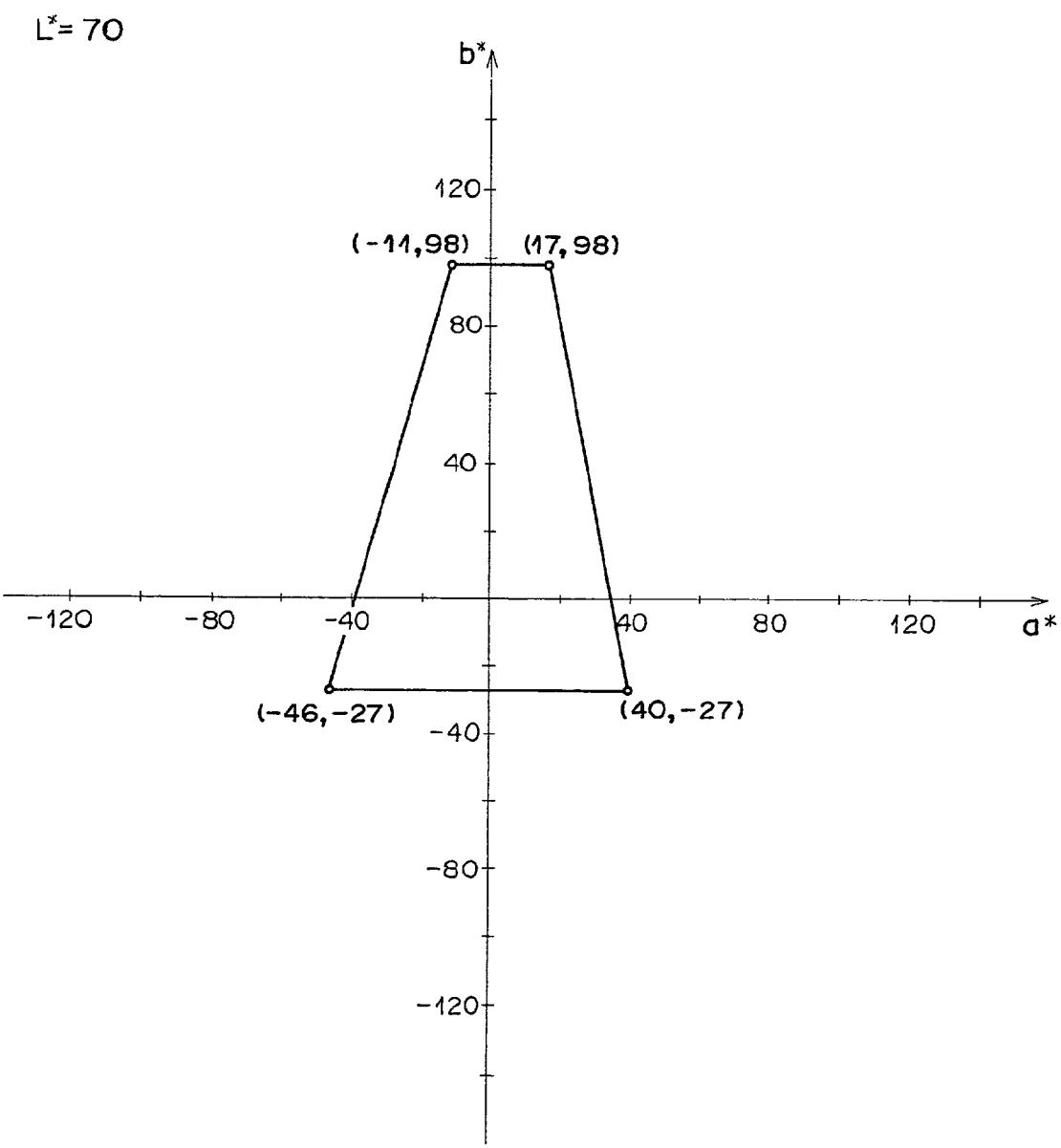
FIG. 9 is an L*a*b* chromaticity diagram illustrating chromaticity coordinates (a*,b*), the diagram showing an example of a color range of the first embodiment of the sheet for a platen cover in accordance with the present invention as for a lightness of L*=70.
Figure 10:
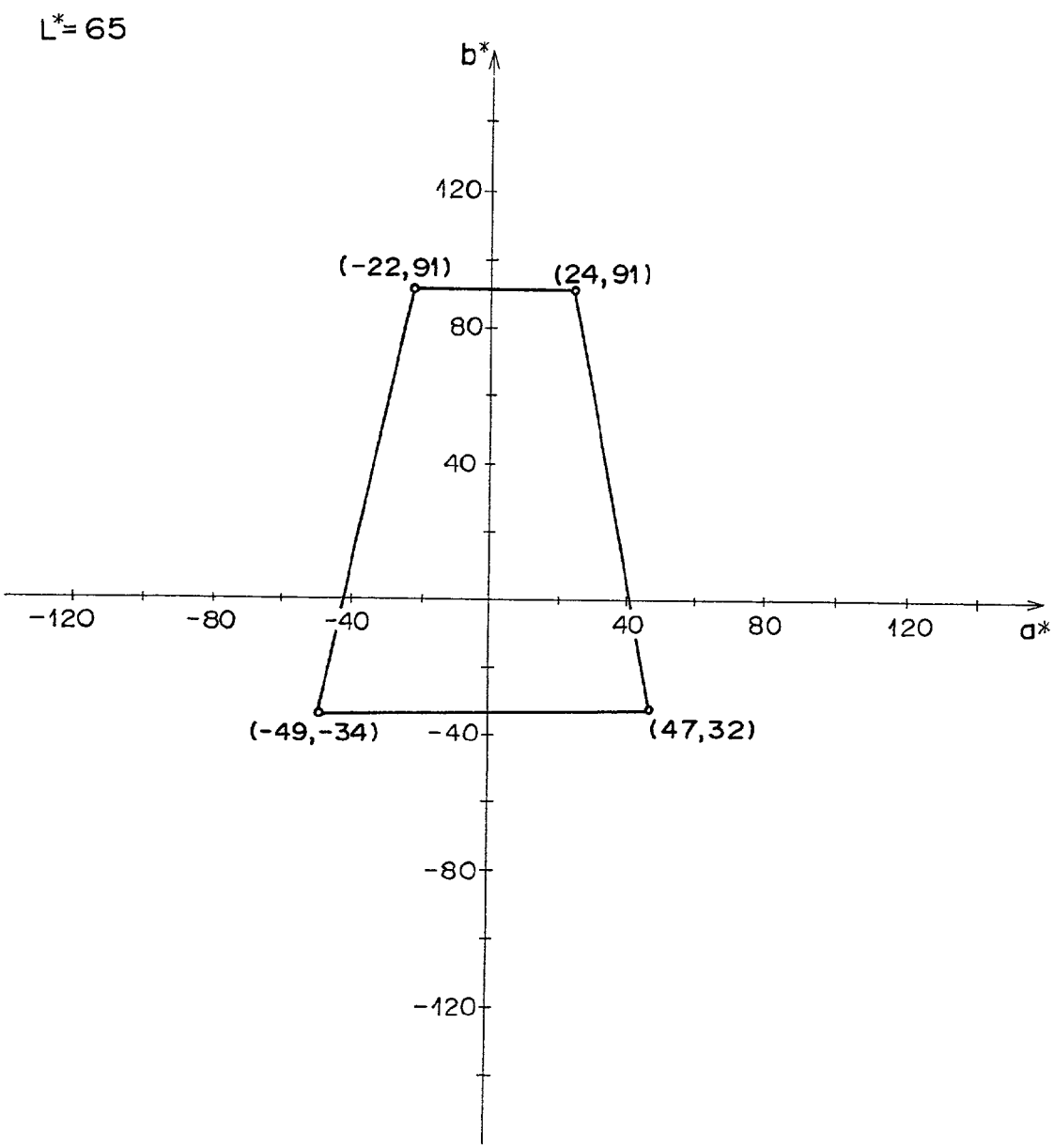
FIG. 10 is an L*a*b* chromaticity diagram illustrating chromaticity coordinates (a*,b*), the diagram showing an example of a color range of the first embodiment of the sheet for a platen cover in accordance with the present invention as for a lightness of L*=65.
Figure 11:
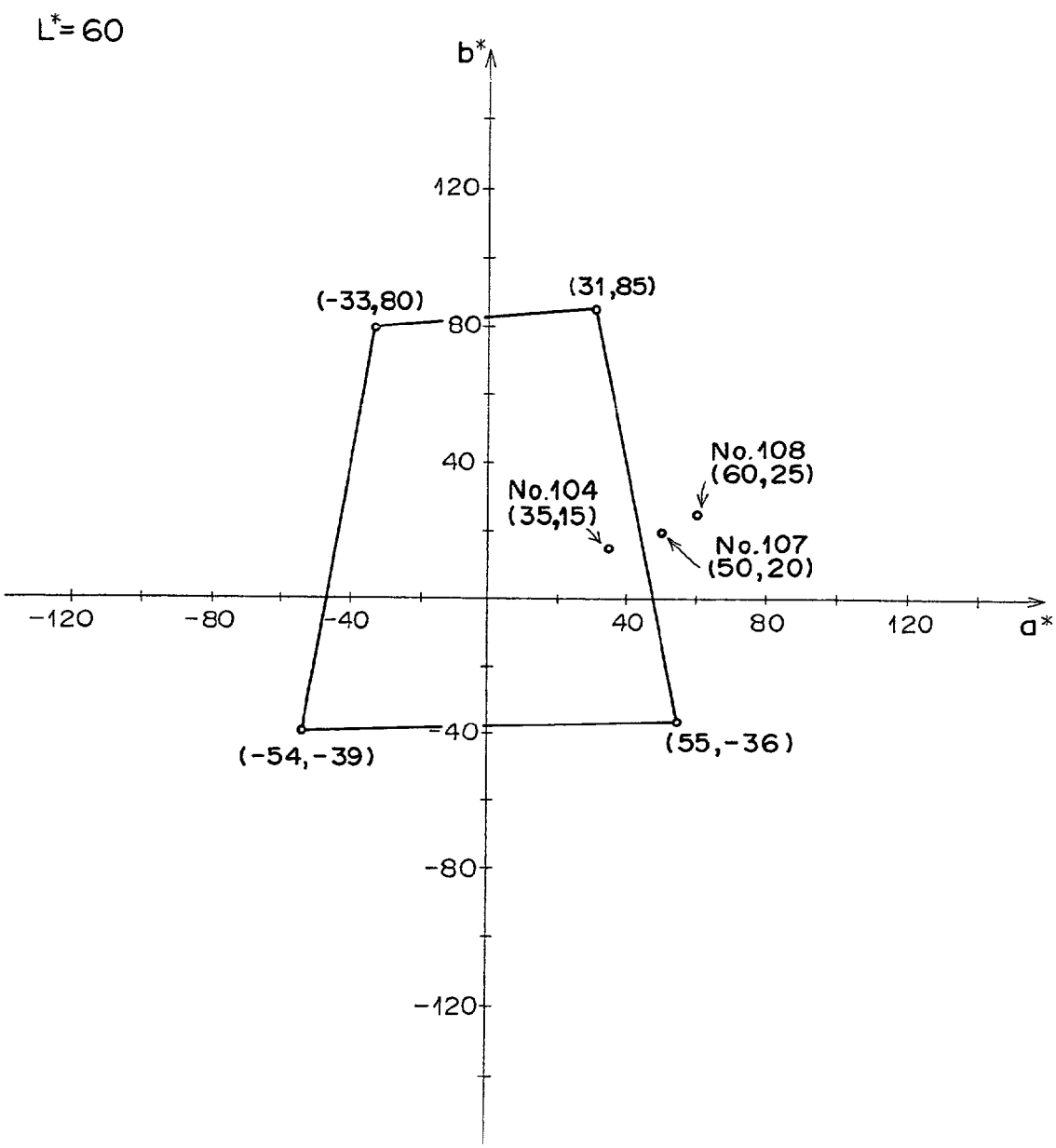
FIG. 11 is an L*a*b* chromaticity diagram illustrating chromaticity coordinates (a*,b*), the diagram showing an example of a color range of the first embodiment of the sheet for a platen cover in accordance with the present invention as for a lightness of L*=60.
Figure 12:
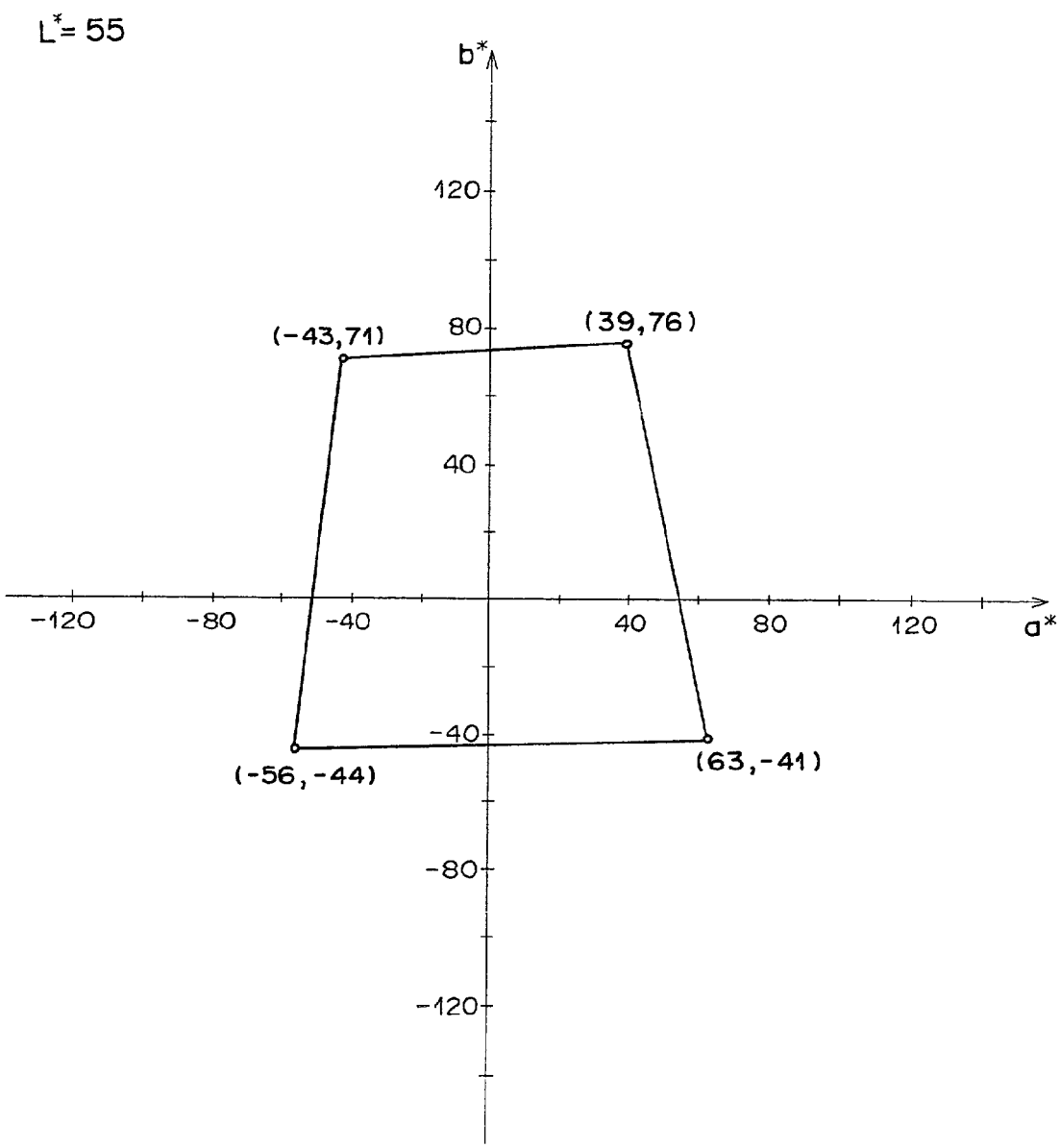
FIG. 12 is an L*a*b* chromaticity diagram illustrating chromaticity coordinates (a*,b*), the diagram showing an example of a color range of the first embodiment of the sheet for a platen cover in accordance with the present invention as for a lightness of L*=55.
Figure 13:
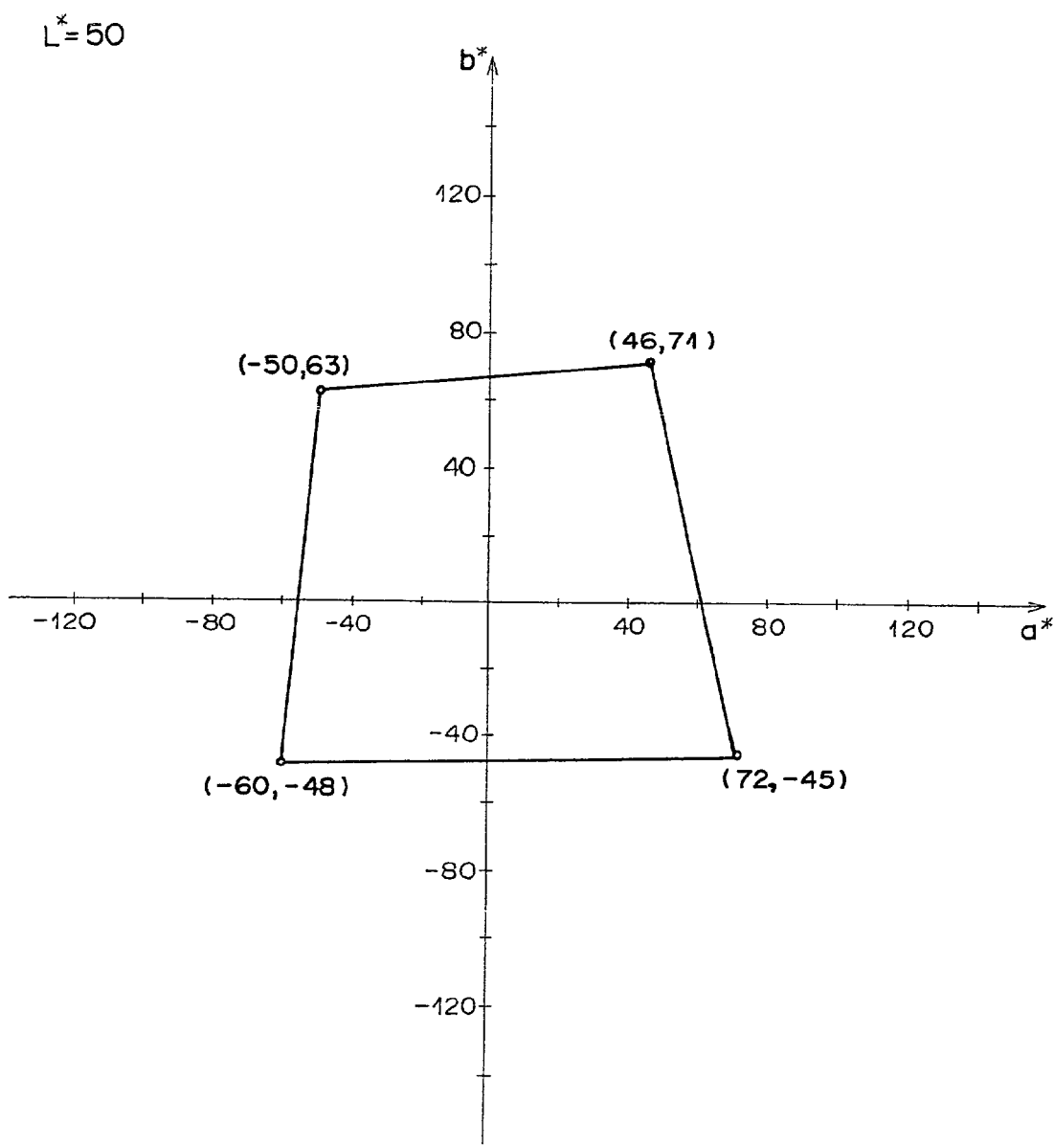
FIG. 13 is an L*a*b* chromaticity diagram illustrating chromaticity coordinates (a*,b*), the diagram showing an example of a color range of the first embodiment of the sheet for a platen cover in accordance with the present invention as for a lightness of L*=50.
Figure 14:
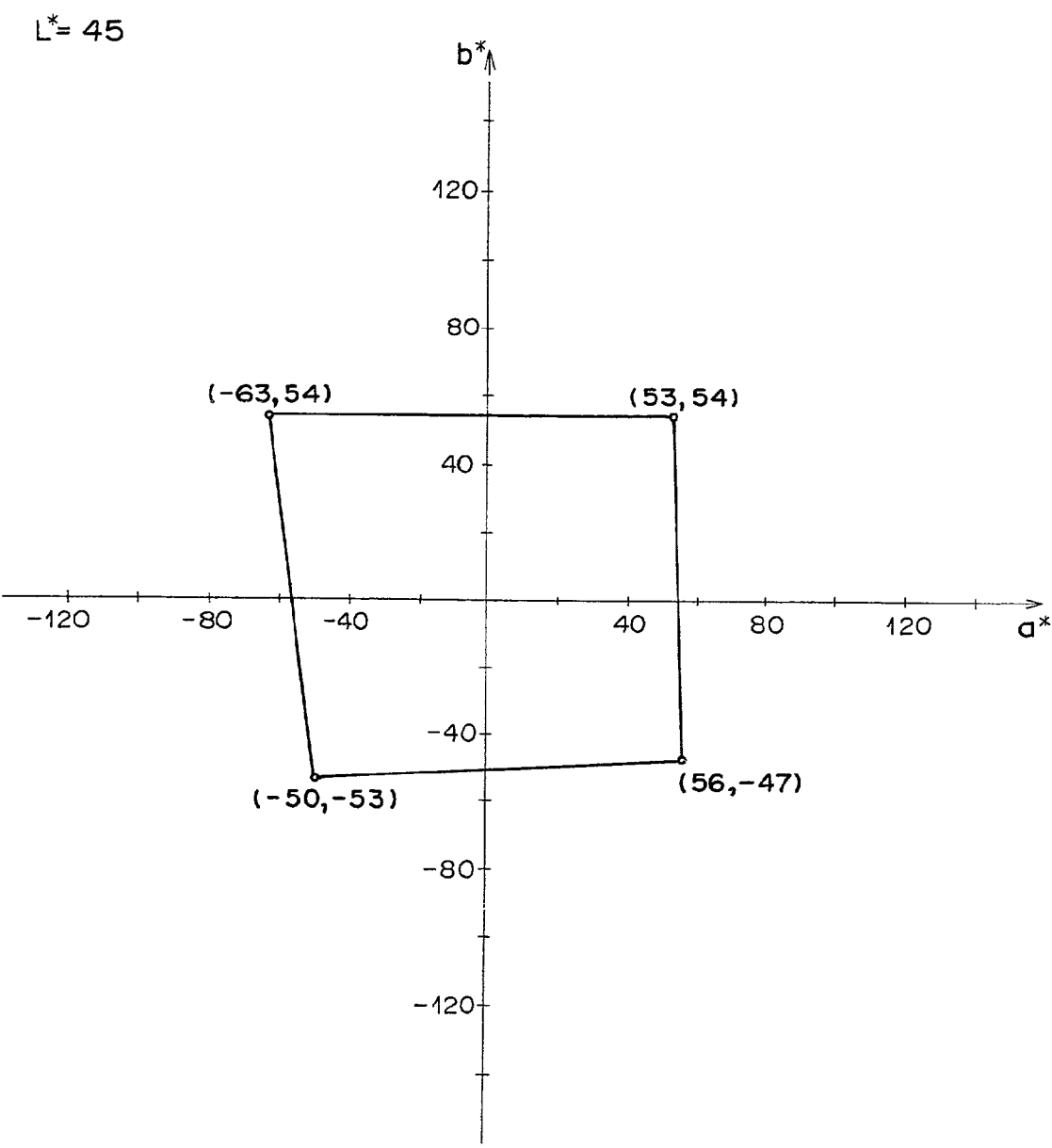
FIG. 14 is an L*a*b* chromaticity diagram illustrating chromaticity coordinates (a*,b*), the diagram showing an example of a color range of the first embodiment of the sheet for a platen cover in accordance with the present invention as for a lightness of L*=45.
Figure 15:
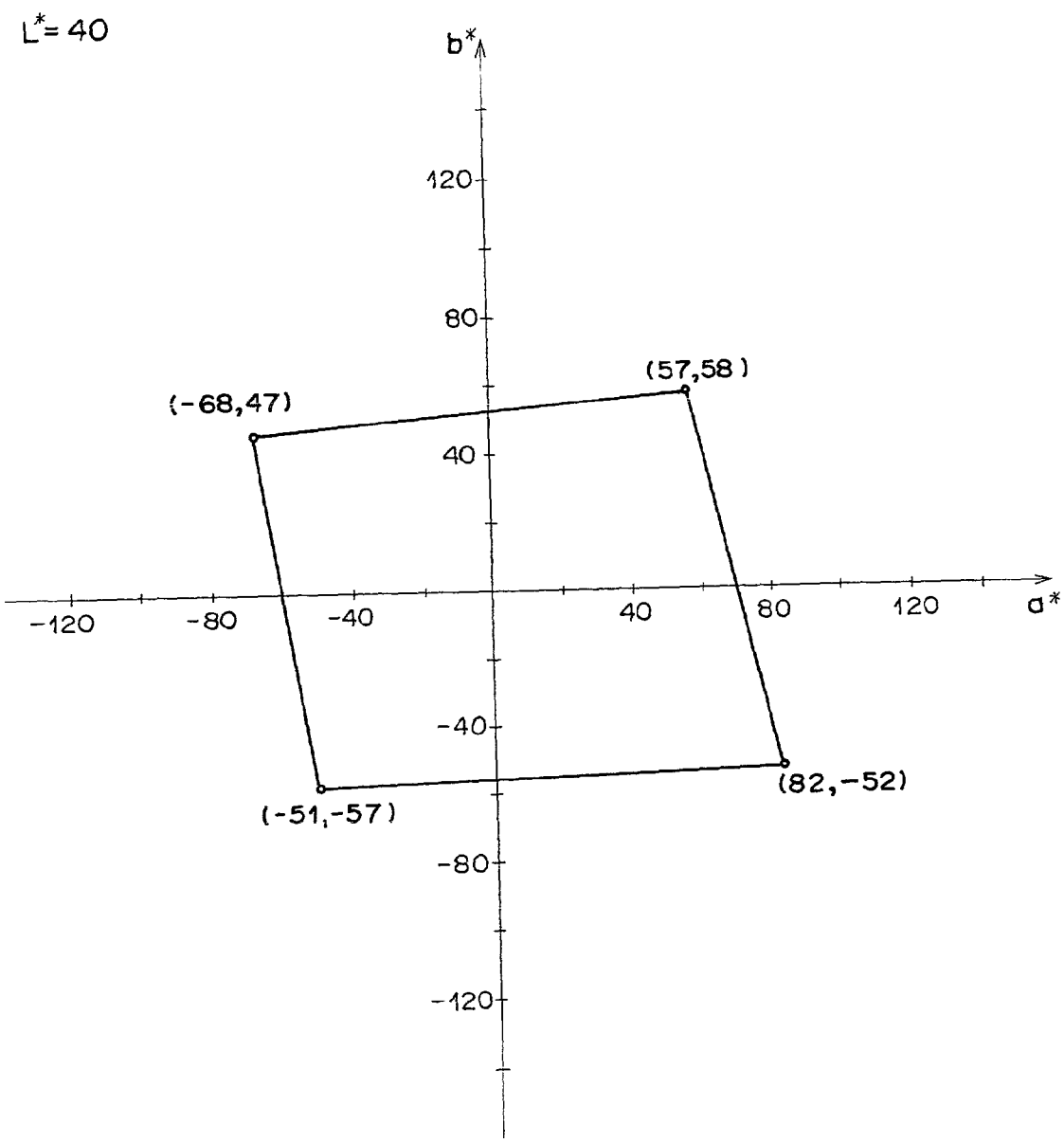
FIG. 15 is an L*a*b* chromaticity diagram illustrating chromaticity coordinates (a*,b*), the diagram showing an example of a color range of the first embodiment of the sheet for a platen cover in accordance with the present invention as for a lightness of L*=40.
Figure 16:
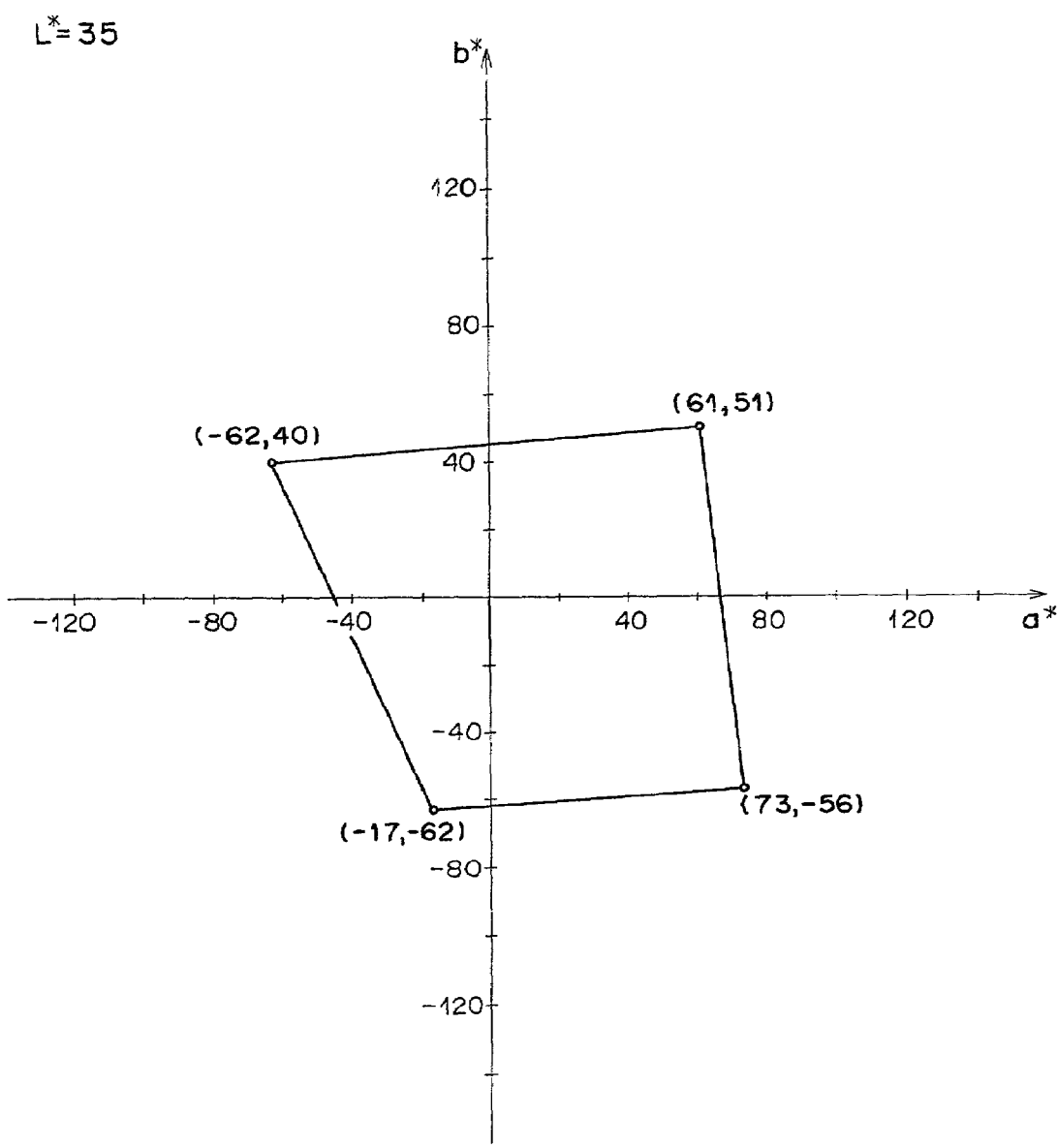
FIG. 16 is an L*a*b* chromaticity diagram illustrating chromaticity coordinates (a*,b*), the diagram showing an example of a color range of the first embodiment of the sheet for a platen cover in accordance with the present invention as for a lightness of L*=35.
Figure 17:
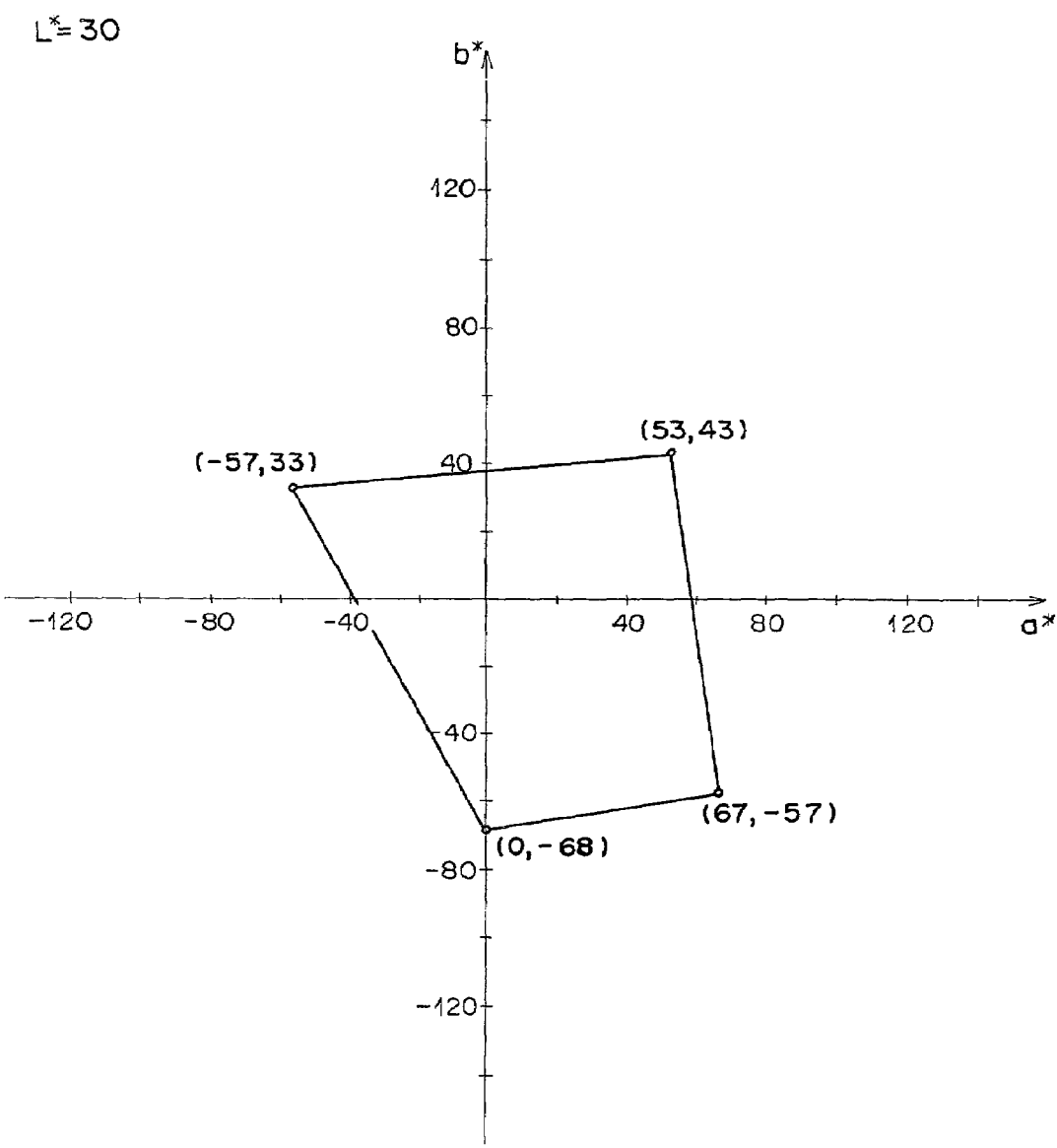
FIG. 17 is an L*a*b* chromaticity diagram illustrating chromaticity coordinates (a*,b*), the diagram showing an example of a color range of the first embodiment of the sheet for a platen cover in accordance with the present invention as for a lightness of L*=30.
Figure 18:
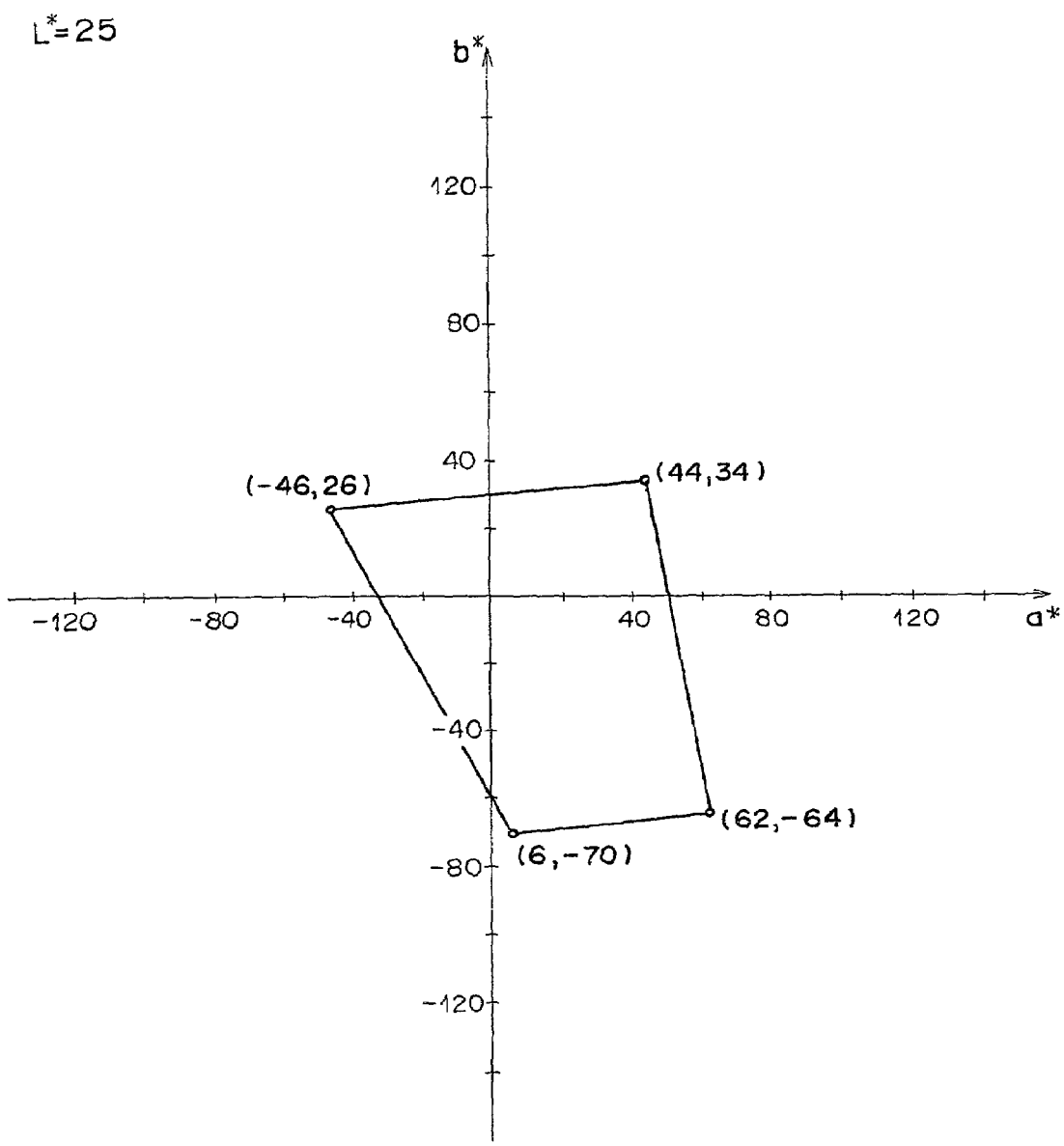
FIG. 18 is an L*a*b* chromaticity diagram illustrating chromaticity coordinates (a*,b*), the diagram showing an example of a color range of the first embodiment of the sheet for a platen cover in accordance with the present invention as for a lightness of L*=25.
Figure 19:
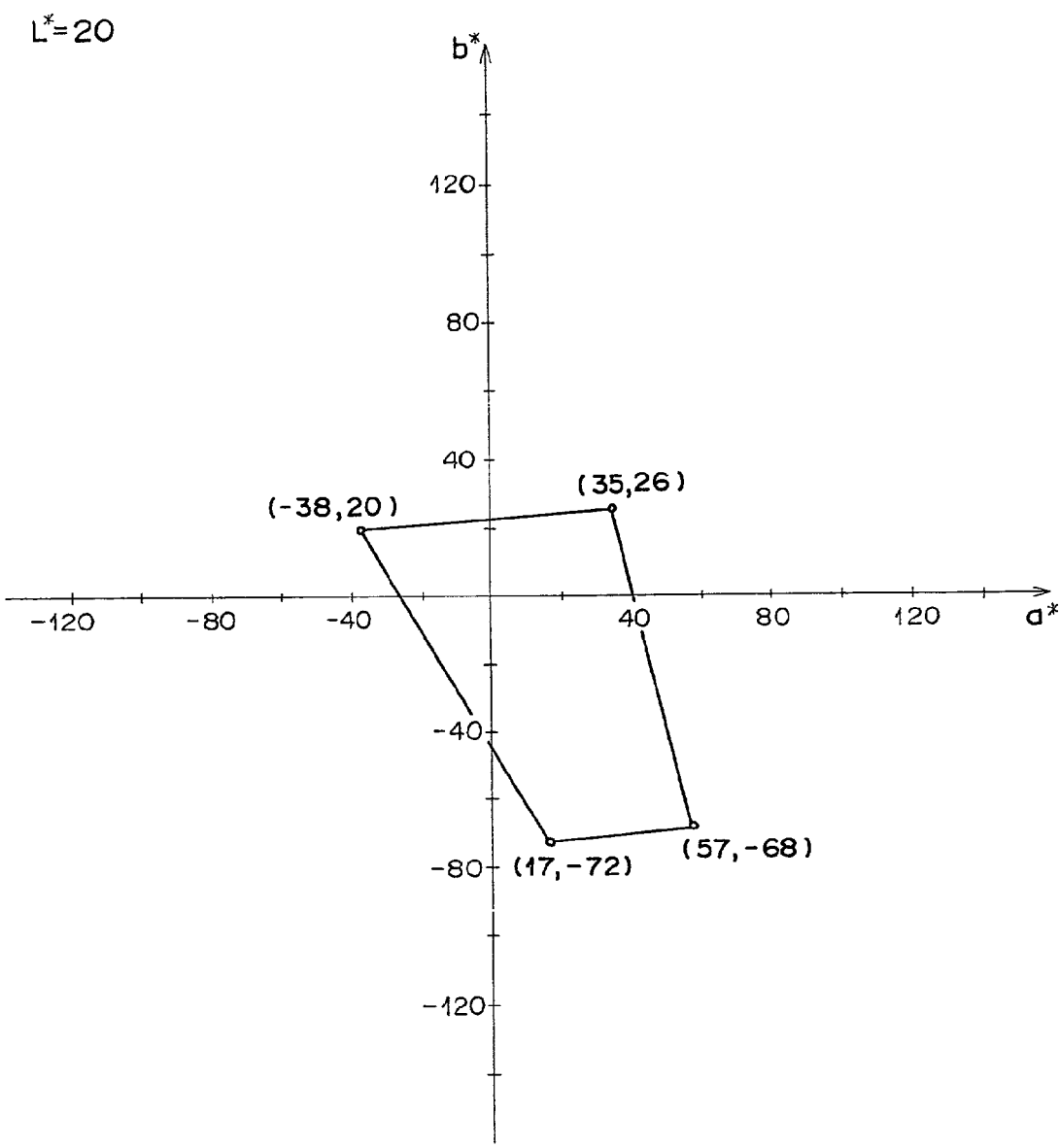
FIG. 19 is an L*a*b* chromaticity diagram illustrating chromaticity coordinates (a*,b*), the diagram showing an example of a color range of the first embodiment of the sheet for a platen cover in accordance with the present invention as for a lightness of L*=20.
Figure 20:
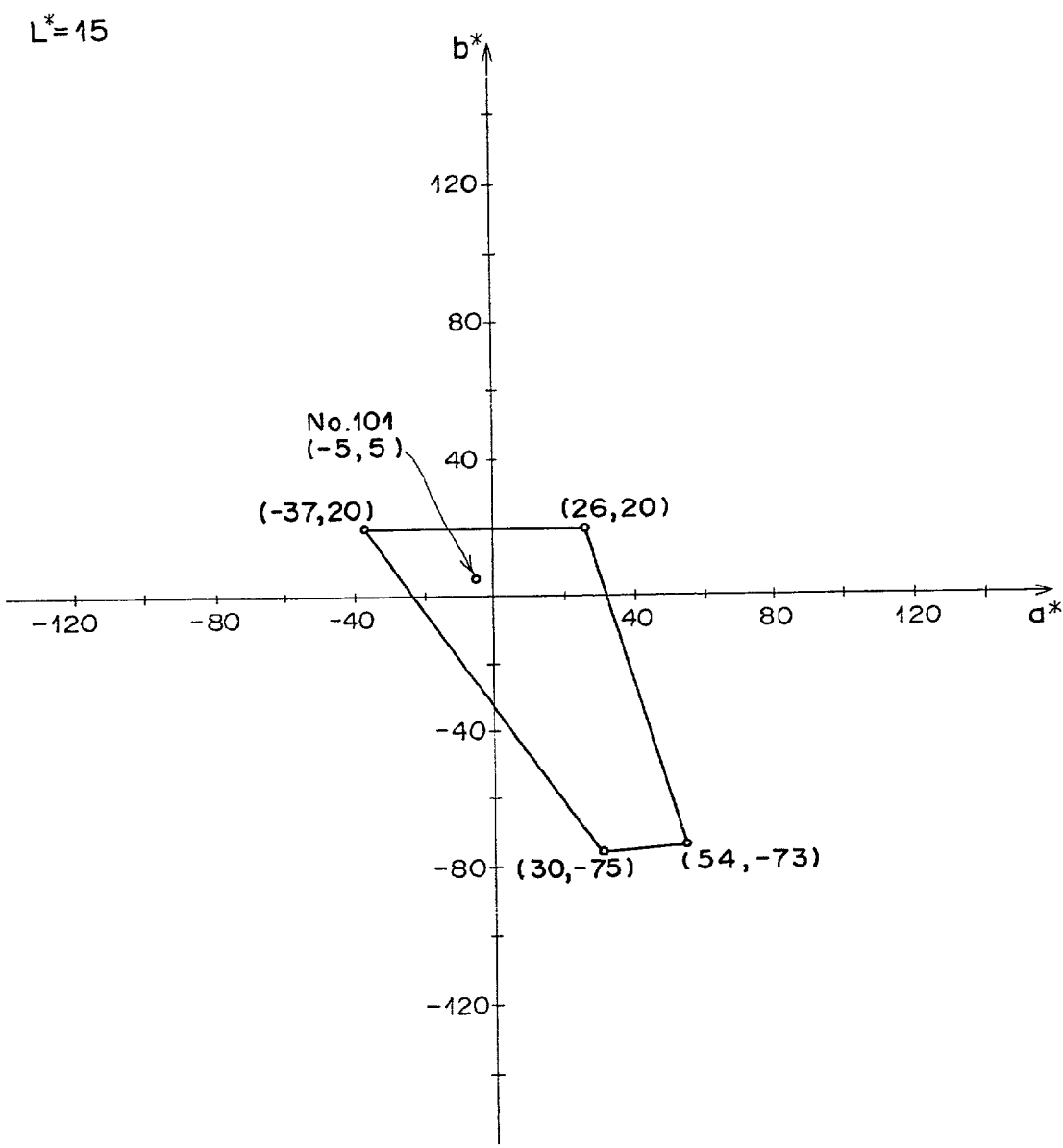
FIG. 20 is an L*a*b* chromaticity diagram illustrating chromaticity coordinates (a*,b*), the diagram showing an example of a color range of the first embodiment of the sheet for a platen cover in accordance with the present invention as for a lightness of L*=15.

FIG. 4 is a block diagram showing an example of the image information extracting means 63. As illustrated in FIG. 4, the image information extracting means 63 comprises modeling means 66 for modeling the shape, which expresses the boundary of each of the regions corresponding to the image storage sheets (i.e., the boundary of each of the image objects), into a predetermined shape in accordance with the results of discrimination made by the image storage sheet region recognizing means 62. The image information extracting means 63 also comprises image forming means 67 for performing desired image processing on the image signal components of the color image signals having been received from the image information read-out means 60, which image signal components represent each of the image objects having the modeled shapes, locating the thus processed image signal components at a predetermined position within a frame in the template image, and thereby forming the template-appended image signals.

When the image objects have been detected by the image storage sheet region recognizing means 62, the modeling means 66 recognizes the boundary between each of the image objects and the background region (i.e., the region corresponding to the colored sheet 15) by utilizing a known technique, such as an edge tracing technique. Thereafter, the modeling means 66 models the shape of the boundary into the predetermined shape (e.g., a rectangle or a circle). (As for the modeling, reference may be made to, for example, Japanese Unexamined Patent Publication No. 10(1998)-222688.)

The image forming means 67 performs the desired image processing on the image signal components representing each of the image objects, whose shapes have been modeled. Thereafter, the image forming means 67 performs the processing for determining the orientation and the position of each image object (including the processing for rotating the image object) in a predetermined frame in the predetermined template image, and thereby forms the template-appended image signals. Also, when necessary, the image forming means 67 performs desired image processing on the template-appended image signals having thus been formed. The image forming means 67 then feeds the template-appended image signals into the image reproducing means 65.

How the region corresponding to each of the image storage sheets and the background region (i.e., the region corresponding to the colored sheet 15) are discriminated from each other will be described hereinbelow. As described above, the colored sheet 15, which is fitted to the side of the image storage sheet pushing surface 13a of the platen cover 13, has a color or a color array pattern, which is appropriate for the discrimination of the region corresponding to each of the color photoprints. Firstly, the first embodiment of the colored sheet 15 and how the region recognizing processing is performed in the cases of the first embodiment of the colored sheet 15 will be described hereinbelow.

The first embodiment of the colored sheet 15 has a color, which has a chromaticity outside the color ranges illustrated in FIG. 5 through FIG. 22 and which falls within a range capable of being detected by the scanner 10. The light source condition of the scanner 10 is F8.

The measurement of the chromaticity of the color of the colored sheet 15 can be made with an ordinary chromoscope. As an example of the chromoscope, Gretag may be employed.

Figure 22:
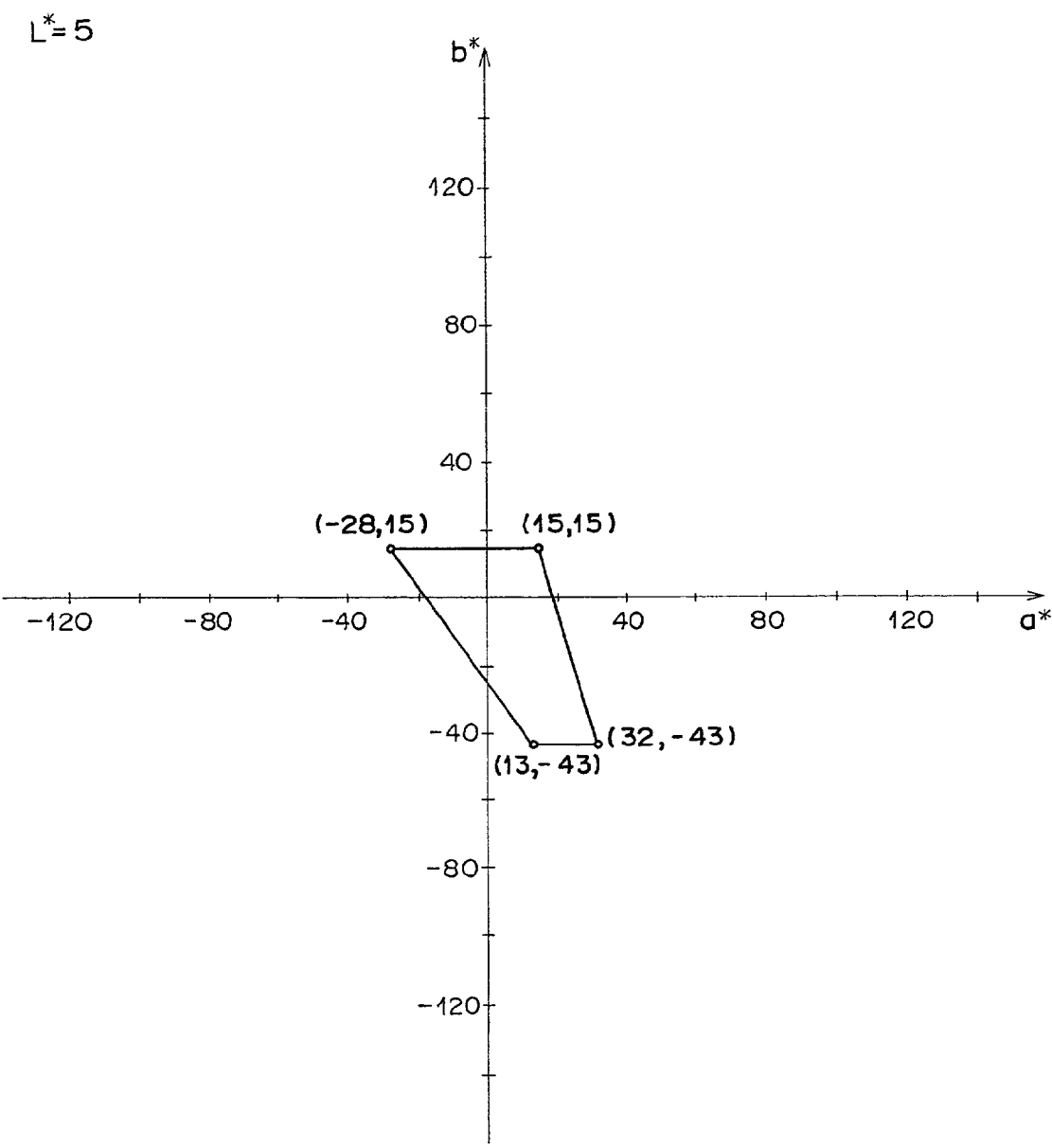
FIG. 22 is an L*a*b* chromaticity diagram illustrating chromaticity coordinates (a*,b*), the diagram showing an example of a color range of the first embodiment of the sheet for a platen cover in accordance with the present invention as for a lightness of L*=5.

FIG. 5 through FIG. 22 illustrate boundary lines of color ranges, which can be reproduced on the color photoprints, on equi-lightness planes in the coordinate system of the L*a*b* color space, the equi-lightness planes being taken at intervals of a lightness L* of 5 within the range of L*=90 (in FIG. 5) to L*=5 (in FIG. 22). In several drawings, color coordinates of dyes (or pigments) employed in Examples (and in Comparative Examples), which will be described later, are also illustrated.

The regions, which are surrounded by boundary lines connecting the points having chromaticity coordinates (a*, b*) illustrated in FIG. 5 through FIG. 22, represent the chromaticity ranges corresponding to the chromaticity ranges capable of being reproduced on the color photoprints, which are ordinarily commercially available at present.

The regions, which are illustrated on the L*a*b* chromaticity diagrams illustrating the chromaticity coordinates (a*,b*) in FIG. 5 through FIG. 22, are as follows:

(1) a quadrangular region surrounded by lines connecting points having chromaticity coordinates (a*,b*) of (−28,15), (15,15), (32,−43), and (13,−43) as for a lightness of L*=5, (2) a triangular region surrounded by lines connecting points having chromaticity coordinates (a*,b*) of (−33,20), (14,20), and (47,−92) as for a lightness of L*=10, (3) a quadrangular region surrounded by lines connecting points having chromaticity coordinates (a*,b*) of (−37,20), (26,20), (54,−73), and (30,−75) as for a lightness of L*=15, (4) a quadrangular region surrounded by lines connecting points having chromaticity coordinates (a*,b*) of (−38,20), (35,26), (57,−68), and (17,−72) as for a lightness of L*=20, (5) a quadrangular region surrounded by lines connecting points having chromaticity coordinates (a*,b*) of (−46,26), (44,34), (62,−64), and (6,−70) as for a lightness of L*=25, (6) a quadrangular region surrounded by lines connecting points having chromaticity coordinates (a*,b*) of (−57,33), (53,43), (67,−57), and (0,−68) as for a lightness of L*=30, (7) a quadrangular region surrounded by lines connecting points having chromaticity coordinates (a*,b*) of (−62,40), (61,51), (73,−56), and (−17,−62) as for a lightness of L*=35, (8) a quadrangular region surrounded by lines connecting points having chromaticity coordinates (a*,b*) of (−68,47), (57,58), (82,−52), and (−51,−57) as for a lightness of L*=40, (9) a quadrangular region surrounded by lines connecting points having chromaticity coordinates (a*,b*) of (−63,54), (53,54), (56,−47), and (−50,−53) as for a lightness of L*=45,

(10) a quadrangular region surrounded by lines connecting points having chromaticity coordinates (a*,b*) of (−50, 63), (46,71), (72,−45), and (−60,−48) as for a lightness of L*=50,

(11) a quadrangular region surrounded by lines connecting points having chromaticity coordinates (a*,b*) of (−43, 71), (39,76), (63,−41), and (−56,−44) as for a lightness of L*=55,

(12) a quadrangular region surrounded by lines connecting points having chromaticity coordinates (a*,b*) of (−33, 80), (31,85), (55,−36), and (−54,−39) as for a lightness of L*=60,

(13) a quadrangular region surrounded by lines connecting points having chromaticity coordinates (a*,b*) of (−22, 91), (24,91), (47,−32), and (−49,−34) as for a lightness of L*=65,

(14) a quadrangular region surrounded by lines connecting points having chromaticity coordinates (a*,b*) of (−11, 98), (17,98), (40,−27), and (−46,−27) as for a lightness of L*=70,

(15) a quadrangular region surrounded by lines connecting points having chromaticity coordinates (a*,b*) of (−5, 122), (6,123), (29,−23), and (−41,−23) as for a lightness of L*=75,

(16) a quadrangular region surrounded by lines connecting points having chromaticity coordinates (a*,b*) of (−6, 103), (5,103), (22,−17), and (−28,−17) as for a lightness of L*=80,

(17) a quadrangular region surrounded by lines connecting points having chromaticity coordinates (a*,b*) of (−7, 69), (4,70), (19,−15), and (−17,−15) as for a lightness of L*=85, and

(18) a quadrangular region surrounded by lines connecting points having chromaticity coordinates (a*,b*) of (−4, 48), (7,48), (15,−12), and (−12,−12) as for a lightness of L*=90.

The first embodiment of the colored sheet 15, which has a color outside the regions of the color ranges illustrated in FIG. 5 through FIG. 22, is fitted to the side of the image storage sheet pushing surface 13a of the platen cover 13. In such cases, even if the image storage sheet pushing surface 13a does not have a color outside the color ranges described above, the side of the image storage sheet pushing surface 13a can be altered easily so as to have the color appropriate for the region recognizing processing, which will be described later.

In FIG. 5 through FIG. 22, the equi-lightness planes are illustrated at intervals of a lightness L* of 5. As for an equi-lightness plane of a lightness L* taking a value between the illustrated equi-lightness planes, chromaticity coordinates (a*,b*) may be interpolated from the chromaticity coordinates (a*,b*), which are defined on the illustrated equi-lightness planes adjacent to each other. Alternatively, the chromaticity coordinates (a*,b*), which are defined on either one of the illustrated equi-lightness planes adjacent to each other, may be employed as the chromaticity coordinates (a*,b*) on the equi-lightness plane between the illustrated equi-lightness planes adjacent to each other.

In order for the region recognizing processing described later to be performed accurately (and reliably), a color having chromaticity coordinates (a*,b*), which are remote outwardly from the boundary lines illustrated in FIG. 5 through FIG. 22 in the color space, should preferably be employed as the color of the colored sheet 15. For such purposes, the coordinates of each of the vertexes, which define the color range in each of FIG. 5 through FIG. 22, may be translated in a direction heading away from the origin on the a*-b* plane, such that a hue angle H may be kept at a predetermined value. In this manner, an extended color range may be formed, and a color outside the extended color range may be employed as the color of the colored sheet 15. The hue angle H may be represented by a formula H=tan(b*/a*). Therefore, in order for the coordinates of each of the vertexes described above to be translated by a predetermined distance ΔE such that the hue angle H may be kept at a predetermined value, the chromaticity coordinates (a*,b*) may be translated to new chromaticity coordinates (a*',b*'), which are represented by the formulas shown below.

$$a^{*\prime} = \gamma a^*$$

$$b^{*\prime} = \gamma b^*$$

$$\gamma = \{\Delta E/(a^{*2}+b^{*2})^{1/2}\}+1$$

In such case, an extended color range may be formed by setting such that, for example, ΔE=5, and a color outside the extended color range may be employed as the color of the colored sheet 15. Such that particularly excellent effects may be obtained, Δ should more preferably be set at 10.

The colored sheet 15, which is fitted to the side of the image storage sheet pushing surface 13a of the platen cover 13, may be colored with a dye containing a fluorescent substance (of one of various kinds), which produces the fluorescence of a color outside the color ranges described above and having wavelengths capable of being detected by the scanner 10.

In cases where the colored sheet 15 having the color outside the color ranges described above is utilized, the user firstly locates at least one color photoprint, which acts as the image storage sheet 40, within the read-out region 12a on the platen 12 and closes the platen cover 13. In this state, the user causes the personal computer 20 to begin the scanning operation (i.e., the image read-out operation) with the scanner 10. As a result, in the scanner 10, scanning light (i.e., reading light) L is produced by the light source (not shown) and is irradiated toward the platen cover 13. When the scanning light L is irradiated to the region outward from the color photoprint, the scanning light L impinges upon the colored sheet 15, and the color of the colored sheet 15 is detected by a light receiving means (not shown). When the scanning light L is irradiated to the color photoprint, colors of the image having been recorded on the color photoprint are detected by the light receiving means.

In the personal computer 20 acting as the apparatus for recognizing a region corresponding to an image storage sheet, the processing for recognizing the region corresponding to the color photoprint in accordance with the coloring form of the colored sheet 15 is performed in the manner described below on the image signals, which have been received from the scanner 10 and which represent the read-out image within the read-out region 12a. Specifically, in the personal computer 20 (with the functions of the comparison and judgment means 61 shown in FIG. 3), the image signals (i.e., the image signals in the RGB color space) corresponding to the read-out region 12a and having been obtained from the scanner 10 are transformed into the image signals in the L*a*b* color space. Thereafter, the image signal components of the image signals in the L*a*b* color space having been obtained from the transformation described above, which image signal components represent each pixel, are compared with the values of the color of the colored sheet 15 in the L*a*b* color space. In this manner, a judgment is made as to whether the color of each pixel in the read-out image is or is not identical with the color of the colored sheet 15. In cases where it has been judged that the color of each pixel in the read-out image is identical with the color of the colored sheet 15, it is recognized that the pixel in the read-out image is not a pixel falling within the region corresponding to the image storage sheet (in this case, the color photoprint). In cases where it has been judged that the color of each pixel in the read-out image is different from the color of the colored sheet 15, it is recognized that the pixel in the read-out image is a pixel falling within the region corresponding to the image storage sheet (in this case, the color photoprint). (The recognition is made with the functions of the image storage sheet region recognizing means 62 shown in FIG. 3.) The values of the color of the colored sheet 15 in the L*a*b* color space may be calculated from image signal components, which correspond to the peripheral region outward from the read-out region 12a, or from image signals, which have been obtained by performing the image read-out operation without the image storage sheets 40, 40, . . . being located on the platen 12.

The color of the colored sheet 15 is the color outside the chromaticity ranges described above, which color is primarily not contained in color photoprints. Therefore, the region recognizing processing described above is equivalent to the processing, in which a judgment is made as to whether the color of each pixel in the read-out image falls or does not fall within the chromaticity ranges described above, in which it is recognized that the pixel in the read-out image is not a pixel corresponding to the color photoprint in cases where it has been judged that the color of the pixel in the read-out image does not fall within the chromaticity ranges described above, and in which it is recognized that the pixel in the read-out image is a pixel corresponding to the color photoprint in cases where it has been judged that the color of the pixel in the read-out image falls within the chromaticity ranges described above. In this manner, the discrimination of the color of the color photoprint and the color of the colored sheet 15 is capable of being made reliably in the read-out image having been read out by the scanner 10. Therefore, the presence or absence of the color photoprint at a certain position is capable of being detected reliably. Specifically, the recognition of the region corresponding to the color photoprint is capable of being made reliably. As illustrated in FIG. 1, in cases where the plurality of the color photoprints are located on the platen 12, the recognition of the region corresponding to the color photoprint is made with respect to each of the color photoprints.

As described above, the side of the image storage sheet pushing surface 13a of the platen cover 13 (i.e., the colored sheet 15) is colored with the color outside the color range, which is defined on the a*-b* plane for each lightness L*. Therefore, even if the image storage sheet has various colors as in the cases of the color photoprint, the difference between the colors on the image storage sheet and the color of the platen cover 13 (specifically, the colored sheet 15) can be discriminated accurately.

Thereafter, in the personal computer 20, the position, the shape, and the orientation angle of the region corresponding to each color photoprint are recognized automatically. Specifically, when the image object (i.e., the region corresponding to each color photoprint) in the read-out image has been detected in the manner described above and the boundary between the image object and the background region corresponding to the colored sheet 15 has been discriminated, the shape of the image object is modeled. After the image object has been detected and the shape of the image object has been modeled, structured image signals, which represent the object image, are formed. The structured image signals may contain the image signals, which represent the image object, and signals representing the position, the shape, and the orientation of each image object, and a combination of image objects.

In the personal computer 20, after the region recognizing processing on the color photoprint has been performed in the manner described above, the processing for determining the orientation and the position of each image object (in this case, each color photoprint) is performed automatically. For example, the image object is automatically located and drawn within a predetermined frame in a predetermined template image. Specifically, a predetermined template is utilized, and the image object is automatically located at a predetermined position in a document or on a page. The template image may contain image patterns, which have been prepared previously, and title characters, which are specified from the keyboard 23, or the like. The fitting of the image object into the template image is performed ordinarily in cases where, for example, postcards, such as letters of inquiry after person's health in the hot season and New Year's cards.

In cases where the personal computer 20 is provided with image editing ability, after a plurality of image objects (the color photoprints) contained in the read-out image are discriminated, the plurality of the image objects can be separated from one another, a plurality of independent images can be formed by the utilization of the separated image objects, and processing can be performed on each of the thus formed images. For example, each of the image objects having been located in the template image can be selected by dragging a side or a corner of the image object with the mouse device 24a and can be subjected to alteration of the position, scaling (alteration of the size), or rotation.

After the image satisfying the conditions desired by the user (e.g., the template-appended image described above) has been composed, the composed image can be saved on a disk by the selection of an edited image saving button. Also, the composed image can be printed with the printer 30. Further, the image signal representing the composed image can be transferred through the network 50 to a printing laboratory, and the composed image can be printed at the printing laboratory.

Besides the fitting of the image objects into the template image, the image processing system 1 is also capable of forming a digital photo album by processing the image signal in order to relocate the images, which were recorded on the plurality of the color photoprints located on the platen 12 of the scanner 10, and to allocate the images to one page in the album.

The second embodiment of the colored sheet 15 fitted to the side of the image storage sheet pushing surface 13a of the platen cover 13 will be described hereinbelow. FIGS. 23A, 23B, 23C, and 23D are explanatory views showing examples of color array patterns in the second embodiment of the colored sheet 15.

In the first embodiment of the colored sheet 15 described above, the colored sheet 15 has the color, which is primarily not contained in color photoprints. In the second embodiment of the colored sheet 15, as illustrated in FIGS. 23A, 23B, 23C, and 23D, the colored sheet 15 has one of periodical mosaic patterns (color array patterns) constituted of a plurality of different color areas.

Figures 23A, 23B, 23C, 23D:
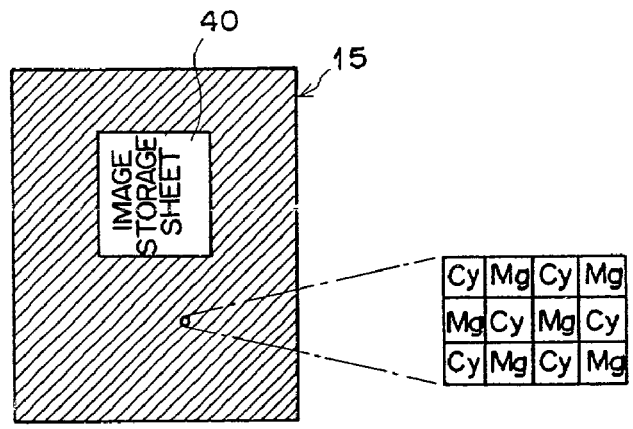
FIGS. 23A, 23B, 23C, and 23D are explanatory views showing examples of color array patterns in a second embodiment of the sheet for a platen cover in accordance with the present invention.

Each of the periodical mosaic patterns is set such that, when the recognition of the region corresponding to the image storage sheet is performed in accordance with the image signal having been obtained from the scanner 10, the periodical mosaic pattern is capable of being recognized as being an intentionally imparted pattern, which is primarily not contained in image storage sheets. The periodical mosaic pattern may be constituted of a color array pattern, which is not contained in the image storage sheet 40 subjected to the image read-out operation. For example, in the periodical mosaic pattern, rectangular areas of different colors and having a size, such that the length of one side falls within the range of 0.1 mm to 1 mm (preferably, within the range of 0.15 mm to 0.75 mm), may be arrayed alternately and periodically at a predetermined angle with respect to the main scanning direction and the sub-scanning direction, such that the rectangular areas of the different colors may be in abutment with one another. For example, as illustrated in FIG. 23A, the periodical mosaic pattern may comprise magenta (Mg) and cyan (Cy) two-color rectangular areas, which are arrayed in the directions intersecting perpendicularly to each other and in a checkered pattern. Alternatively, as illustrated in FIG. 23B, the periodical mosaic pattern may comprise red (R), green (G), and blue (B) three-color rectangular areas, which are arrayed in the directions intersecting perpendicularly to each other and in the illustrated order. As another alternative, as illustrated in FIG. 23C, the periodical mosaic pattern may comprise yellow (Y), cyan (Cy), magenta (Mg), and green (G) four-color rectangular areas, which are arrayed in the directions intersecting perpendicularly to each other and in the illustrated order. As a further alternative, as illustrated in FIG. 23D, the periodical mosaic pattern may comprise red (R), green (G), and blue (B) three-color rectangular areas, which are arrayed in a zigzag pattern with respect to one direction. In FIGS. 23A, 23B, 23C, and 23D, the color areas in the color array pattern have the rectangular shapes. Alternatively, the color areas may have the other shapes, such as a triangular shape and a hexagonal shape.

The periodical mosaic pattern may have one of various color array patterns, in which the color areas of a plurality of different colors are arrayed according to a predetermined rule in the main scanning direction and the sub-scanning direction so as to form a periodical pattern (not limited to the checkered pattern) in the mosaic-like form as a whole. Specifically, color areas of an identical color may be adjacent to each other at a certain part in the periodical mosaic pattern. By way of example, the periodical mosaic pattern may be set in the same manner as that in a color array of a color filter of a color CCD image sensor. The form of color array in a striped pattern as proposed in, for example, Japanese Unexamined Patent Publication No. 5(1993)-110779, is not included in the scope of the present invention.

Also, the colors employed in the color array may be the colors, which are contained in the color image recorded on the image storage sheet. However, the colors employed in the color array should preferably be the colors, which are primarily not contained in image storage sheets, as described above with reference to the first embodiment of the colored sheet 15.

Further, one period (i.e., the minimum repeating unit of pattern) in the periodical mosaic pattern should preferably fall within the range of a value two times as large as the spatial resolving power, which is defined by the read-out density of the scanner 10), to a value 20 times as large as the spatial resolving power. If the one period is shorter than the value two times as large as the spatial resolving power described above, the periodical mosaic pattern cannot be resolved accurately. If the one period is longer than the value 20 times as large as the spatial resolving power described above, the spacing between adjacent image storage sheets cannot be detected accurately. In cases where the color areas are thus arrayed in the mosaic-like form without leaving any space between adjacent color areas, the problems can be prevented from occurring in that the spacing between adjacent image storage sheets cannot be detected as in cases where the dot pattern is employed as proposed in, for example, Japanese Unexamined Patent Publication No. 5(1993)-110779.

In the second embodiment of the colored sheet 15, as in the first embodiment of the colored sheet 15 described above, each of the color areas of the periodical color array pattern on the colored sheet 15, which is fitted to the side of the image storage sheet pushing surface 13a of the platen cover 13, may be colored with a dye containing a fluorescent substance (of one of various kinds), which produces the fluorescence having wavelengths capable of being detected by the scanner 10.

In the personal computer 20 acting as the apparatus for recognizing a region corresponding to an image storage sheet, a judgment is made as to whether image signal components, which represent the periodical mosaic pattern, are or are not contained in the image signal having been obtained from the scanner 10. (The judgment is made with the comparison and judgment means 61 shown in FIG. 3.) It is recognized that the image signal components of the image signal having been obtained from the scanner 10, which image signal components represent the periodical mosaic pattern, are not the ones representing the region corresponding to the image storage sheet. Also, it is recognized that the image signal components of the image signal having been obtained from the scanner 10, which image signal components do not represent the periodical mosaic pattern, are the ones representing the region corresponding to the image storage sheet. In this manner, the region corresponding to the image storage sheet is discriminated. (The recognition is made with the functions of the image storage sheet region recognizing means 62 shown in FIG. 3.)

By way of example, the judgment as to whether the image signal components, which represent the periodical mosaic pattern, are or are not contained in the image signal having been obtained from the scanner 10 may be made in the manner described below. Specifically, firstly, as for the image signal components of the image signal having been obtained from the scanner 10, which image signal components represent each of the pixels in the read-out image, the image signal components R, G, and B representing the color information of the pixel are compared respectively with reference signal components R0, G0, and B0, which represent the information concerning each of the colors employed in the color array pattern on the colored sheet 15. In this manner, with respect to each of the pixels in the read-out image, the color differences between the image signal components R, G, and B and the three-color reference signal components R0, G0, and B0, respectively, are detected. In cases where the color differences are detected with respect to all of the three colors, it is judged that the pixel associated with the judgment is a pixel falling within the region corresponding to the image storage sheet. In cases where no color difference is detected with respect to one of the three colors (i.e., in cases where the color of the pixel is identical with one of the colors in the color array pattern on the colored sheet 15), the image signal components, which represent the next pixel located in the scanning direction, are compared with the reference signal components R0, G0, and B0. In cases where the order, in which the three colors exhibiting no color difference are detected in the manner described above, conforms to the color array pattern on the colored sheet 15, it is judged that the pixel associated with the judgment is a pixel falling within the region corresponding to the colored sheet 15. In cases where the order, in which the three colors exhibiting no color difference are detected in the manner described above, does not conform to the color array pattern on the colored sheet 15, it is judged that the pixel associated with the judgment is a pixel falling within the region corresponding to the image storage sheet. The values of the reference signal components R0, G0, and B0, which represent the information concerning each of the colors employed in the color array pattern on the colored sheet 15, may be calculated from image signal components, which correspond to the peripheral region outward from the read-out region 12a, or from image signals, which have been obtained by performing the image read-out operation without the image storage sheet 40 being located on the platen 12.

The periodical mosaic pattern formed on the colored sheet 15 is the pattern, which is primarily not contained in image storage sheets and is imparted intentionally to the colored sheet 15. Therefore, even if a color identical with the color on the colored sheet 15 is present at a pixel in the color image recorded on the image storage sheet 40, the pixel is not judged by mistake as a pixel outside the region corresponding to the image storage sheet. Specifically, the discrimination between the region corresponding to the image storage sheet and the region corresponding to the colored sheet 15 of the platen cover 13 is capable of being made reliably in the read-out image having been read out by the scanner 10. Therefore, the presence or absence of the image storage sheet at a certain position is capable of being detected reliably. Specifically, the recognition of the region corresponding to the image storage sheet is capable of being made reliably.

As described above, the side of the image storage sheet pushing surface 13a of the platen cover 13 (i.e., the colored sheet 15) is colored with the periodical mosaic pattern (i.e., the color pattern), which comprises a plurality of color areas of different colors. Therefore, even if the image storage sheet has various colors as in the cases of the color photoprint, the region corresponding to the image storage sheet and the region corresponding to the colored sheet 15 can be accurately discriminated from each other.

Examples, in which the colored sheets in accordance with the present invention are employed, and Comparative Examples, in which colored sheets outside the scope of the present invention, will be described hereinbelow.

In the Examples and the Comparative Examples described below, a total of 100 snapshots were taken with a camera (Travel Mini (trade name), supplied by Fuji Photo Film Co., Ltd.) and a film with lens (Utsurundesu (trade name), supplied by Fuji Photo Film Co., Ltd.) at Tokyo Disney Land and the peripheral area on May 25, 1999. Thereafter, L-size frame-less prints were formed in accordance with the ordinary procedure at Kanagawa Fuji Color Processing Laboratory.

The thus obtained L-size prints were scanned randomly at a read-out density of 600 dpi and with an A4-size flat bed scanner (Scan Maker IV, supplied by Microtec Co.). Also, image processing was performed on the thus obtained images with a smart scanning system described in Japanese Unexamined Patent Publication No. 10(1998)-222688.

EXAMPLE 1

The color of the colored sheet 15 fitted to the side of the image storage sheet pushing surface 13a of the platen cover 13 was set at various colors listed in Table 1 below by utilizing compounds A through F shown later, and the images were read out from the color photoprints. As for the parameter setting of the scanner 10, parameters for discrimination of the printing range were optimized in accordance with each of the colors of the colored sheets 15, 15, . . . .

A test was performed by randomly selecting an arbitrary group of eight color photoprints from the 100 color photoprints described above, and performing 12 times of image read-out operations on the selected group of the eight color photoprints by using the scanner 10. The 100 color photoprints were then shuffled, and the test described above was iterated 100 times. In this manner, a total of 1,200 times of tests were performed. In each of the tests, in cases where all of the image ranges of the eight color photoprints in each group were discriminated accurately, the results of the test were regarded as "success." In this manner, a discrimination success rate (in %) with respect to the 1,200 times of tests was calculated. Decimal fractions were rounded to the nearest integral numbers.

As clear from Table 1, in Comparative Examples performed with Sample Nos. 101, 102, 103, and 104 of the colored sheets, which had the colors falling within the color ranges illustrated in FIGS. 20, 5, 7, and 11, respectively, the discrimination success rate was at most 92%. In Examples in accordance with the present invention performed with Sample Nos. 105, 106, 107, and 108 of the colored sheets, which had the colors outside the color ranges illustrated in FIGS. 6 and 11, the discrimination success rate was at least 98%. It was thus found that the image processing system in accordance with the present invention has a high discrimination accuracy. Also, when the results obtained with Sample Nos. 105 and 106 in accordance with the present invention are compared with each other, and when the results obtained with Sample Nos. 107 and 108 in accordance with present invention are compared with each other, it can be found that, in cases where the colored sheet 15 has a color remote outwardly from the boundaries of the illustrated color ranges, a high discrimination success rate is capable of being obtained.

TABLE 1

| Sample No. | | Kind of colored sheet | Chromaticity of colored sheet | | | Test results Discrimination success rate |
|---|---|---|---|---|---|---|
| | | | L* | a* | b* | |
| 101 | Comp. Ex. | A scanner, Scan Maker IV (supplied by Microtec Co.), itself was used | 15 | −5 | 5 | 91 |
| 102 | Comp. Ex. | The platen cover of Copier Printer DC-1250CP (supplied by Fuji Xerox Co.) was used as the pushing plate | 90 | 0 | −2 | 89 |
| 103 | Comp. Ex. | Dyed with Compound A (yellow dye) | 80 | 5 | 80 | 93 |
| 104 | Comp. Ex. | Dyed with Compound B (magenta dye) and Compound A | 60 | 35 | 15 | 92 |
| 105 | Example | Dyed with Compound C (yellow pigment) | 85 | 0 | 100 | 99 |
| 106 | Example | Dyed with Compound D (yellow pigment) | 85 | 0 | 110 | 100 |
| 107 | Example | Dyed with Compound E (magenta pigment) and Compound C | 60 | 50 | 20 | 98 |

TABLE 1-continued
| Sample No. | Kind of colored sheet | Chromaticity of colored sheet | | | Test results Discrimination |
|---|---|---|---|---|---|
| | | L* | a* | b* | success rate |
| 108 Example | Dyed with Compound F (magenta pigment) and Compound D | 60 | 60 | 25 | 100 |
Compound A (yellow dye):
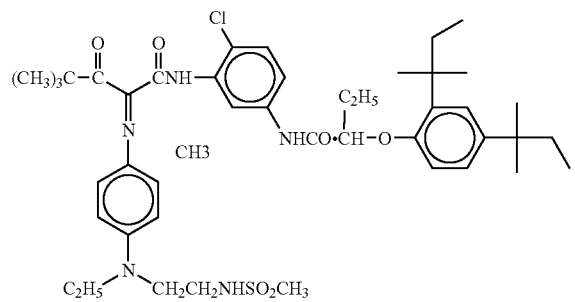
Compound B (magenta dye):
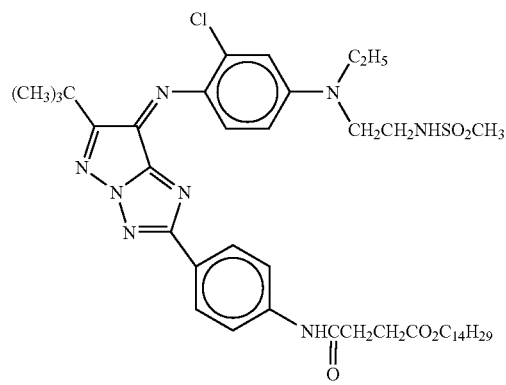
Compound C (yellow pigment):
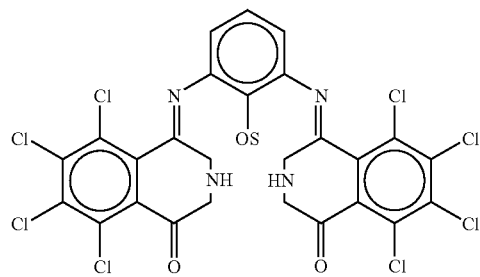
Compound D (yellow pigment):
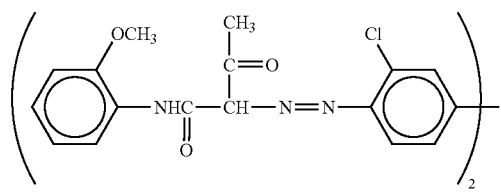

TABLE 1-continued

| | | Chromaticity of colored sheet | | | Test results Discrimination |
|---|---|---|---|---|---|
| Sample No. | Kind of colored sheet | L* | a* | b* | success rate |

Compound E (magenta pigment):

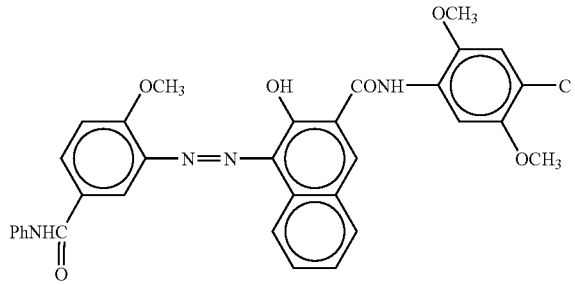

Compound F (magenta pigment):

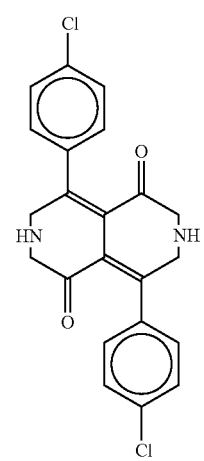

EXAMPLE 2

The periodical pattern on the colored sheet 15 fitted to the side of the image storage sheet pushing surface 13a of the platen cover 13 was set at various periodical patterns listed in Table 2 below, and the images were read out from the color photoprints. Calculation software functions for detecting the periodical structure of the color array pattern were introduced in order to detect the periodical pattern of each colored sheet and to discriminate the print ranges, and the parameters of the calculation software functions were optimized.

As clear from Table 2, in Comparative Examples performed with Sample Nos. 201 and 202 of the colored sheets, which were the conventional colored sheets, the discrimination success rate was at most 89%. In Examples in accordance with the present invention performed with Sample Nos. 203, 204, 205, 206, and 207 of the colored sheets, the discrimination success rate was at least 95%. It was thus found that the image processing system in accordance with the present invention has a high discrimination accuracy. Also, as can be found from the results obtained with Sample Nos. 203 to 206 in accordance with the present invention, even if the colors employed in the color array pattern are the colors, which are primarily contained in the image storage sheets, discrimination success rates higher than a certain level can be obtained. However, when the results obtained with Sample Nos. 203 to 206 in accordance with the present invention and the results obtained with Sample No. 207 in accordance with the present invention are compared with each other, it can be found that, in cases where the colors employed in the color array pattern are the colors, which are primarily not contained in the image storage sheets, the discrimination success rate is capable of being enhanced even further. Further, from the results obtained with Sample Nos. 203 to 206 in accordance with the present invention, it can be found that, in cases where the length of one side of each of the color areas in the color array pattern is set at a small value, which is not smaller than the value of the length defined by the read-out density (i.e., the spatial resolving power) of the scanner (in the examples wherein the read-out density is 600 dpi, the length defined by the read-out density is 0.04 mm), a high discrimination success rate is capable of being obtained. Furthermore, it can be found that, in cases where one period in the color array pattern (i.e., the periodical mosaic pattern) is set at a small value, which is not smaller than the value two times as large as the spatial resolving power defined by the read-out density of the scanner (spatial frequency; in the examples wherein the read-out density is 600 dpi and the color array pattern is the two-color array patter, the spatial resolving power defined by the read-out density is 0.08 mm/cycle), the discrimination success rate is capable of being enhanced even further.

TABLE 2

| Sample No. | | Kind of colored sheet | Test results Discrimination success rate |
|---|---|---|---|
| 201 | Comp.Ex. | A scanner, Scan Maker IV (supplied by Microtec Co.), itself was used | 91 |
| 202 | Comp.Ex. | A dot pattern constituted of dots of red, green, and blue three primary colors each having a diameter of 2 mm were arrayed periodically in the main scanning direction and the sub-scanning direction (as described in Japanese Unexamined Patent Publication No. 5(1993)-110779) | 89 |
| 203 | Example | Square areas, each of which had a length of one side of 2 mm and had the color identical with the color of Sample No. 103, and square areas, each of which had a length of one side of 2 mm and had the color identical with the color of Sample No. 104, were arrayed alternately and in abutment with one another in the main scanning direction and the sub-scanning direction | 95 |
| 204 | Example | Identical with Sample No. 203, except that the length of one side of each square was altered to 0.5 mm | 98 |
| 205 | Example | Identical with Sample No. 203, except that the length of one side of each square was altered to 0.2 mm | 99 |
| 206 | Example | Identical with Sample No. 203, except that the length of one side of each square was altered to 0.1 mm | 96 |
| 207 | Example | Square areas, each of which had a length of one side of 0.5 mm and had the color identical with the color of Sample No. 106, and square areas, each of which had a length of one side of 0.5 mm and had the color identical with the color of Sample No. 108, were arrayed alternately and in abutment with one another in the main scanning direction and the sub-scanning direction | 100 |

The image processing method and system in accordance with the present invention are not limited to the embodiments described above and may be embodied in various other ways.

For example, in the embodiments described above, the colored sheet is fitted to the side of the image storage sheet pushing surface 13a of the platen cover 13 of the scanner. Alternatively, the side of the image storage sheet pushing surface 13a of the platen cover 13 itself may be colored in the same manner as that in the first or second embodiment described above.

Also, in the first embodiment described above, the color photoprint is employed as the image storage sheet. Alternatively, an image storage sheet having been printed with an ink jet printer (or a bubble jet printer) may be employed as the image storage sheet. In such cases, the color of the image storage sheet pushing surface 13a of the platen cover 13 may be set at a color, which is primarily not contained in image storage sheets outputted with the ink jet printer, and the like. In cases where the colored sheet (a film-like colored sheet, a plate-like colored sheet, or the like) is releasably fitted to the side of the image storage sheet pushing surface 13a of the platen cover 13 by utilization of an double-faced adhesive tape, fitting claws, hinge structures, or the like, the colored sheet is capable of being changed over to a different colored sheet in accordance with the image storage sheet to be subjected to the image read-out operation.

In addition, all of the contents of Japanese Patent Application No. 11(1999)-348597 are incorporated into this specification by reference.

What is claimed is:

1. A method of recognizing a region corresponding to an image storage sheet, comprising the steps of:
   i) obtaining a read-out image, which has been acquired by covering an image storage sheet that contains a color image with an image storage sheet pushing surface of a platen cover and reading out an image of a region on the image storage sheet pushing surface of the platen cover, the region on the image storage sheet pushing surface containing the image storage sheet, and
   ii) recognizing a region corresponding to the image storage sheet in the read-out image,
   wherein the image storage sheet pushing surface of the platen cover has a color other than colors which are ordinarily contained in image storage sheets,
   wherein the region corresponding to the image storage sheet is recognized by judging that a pixel in the read-out image, which pixel represents a color different from the color of the image storage sheet pushing surface of the platen cover, is a pixel falling within the region corresponding to the image storage sheet, and
   wherein the image storage sheet is a color photoprint.

2. A method of recognizing a region corresponding to an image storage sheet as defined in claim 1 wherein the color of the image storage sheet pushing surface of the platen cover is a color outside a chromaticity range, which chromaticity range is approximately circumscribed with one of the following regions on $L^*a^*b^*$ chromaticity diagrams illustrating chromaticity coordinates $(a^*,b^*)$:
   (1) a quadrangular region surrounded by lines connecting points having chromaticity coordinates $(a^*,b^*)$ of $(-28, 15)$, $(15,15)$, $(32,-43)$, and $(13,-43)$ as for a lightness of $L^*=5$,
   (2) a triangular region surrounded by lines connecting points having chromaticity coordinates $(a^*,b^*)$ of $(-33, 20)$, $(14,20)$, and $(47,-92)$ as for a lightness of $L^*=10$,
   (3) a quadrangular region surrounded by lines connecting points having chromaticity coordinates $(a^*,b^*)$ of $(-37, 20)$, $(26,20)$, $(54,-73)$, and $(30,-75)$ as for a lightness of $L^*=15$,
   (4) a quadrangular region surrounded by lines connecting points having chromaticity coordinates $(a^*,b^*)$ of $(-38, 20)$, $(35,26)$, $(57,-68)$, and $(17,-72)$ as for a lightness of $L^*=20$,
   (5) a quadrangular region surrounded by lines connecting points having chromaticity coordinates $(a^*,b^*)$ of $(-46, 26)$, $(44,34)$, $(62,-64)$, and $(6,-70)$ as for a lightness of $L^*=25$,
   (6) a quadrangular region surrounded by lines connecting points having chromaticity coordinates $(a^*,b^*)$ of $(-57, 33)$, $(53,43)$, $(67,-57)$, and $(0,-68)$ as for a lightness of $L^*=30$, (7) a quadrangular region surrounded by lines connecting points having chromaticity coordinates (a*,b*) of (−62, 40), (61,51), (73,−56), and (−17,−62) as for a lightness of L*=35,
(8) a quadrangular region surrounded by lines connecting points having chromaticity coordinates (a*,b*) of (−68, 47), (57,58), (82,−52), and (−51,−57) as for a lightness of L*=40,
(9) a quadrangular region surrounded by lines connecting points having chromaticity coordinates (a*,b*) of (−63, 54), (53,54), (56,−47), and (−50,−53) as for a lightness of L*=45,
(10) a quadrangular region surrounded by lines connecting points having chromaticity coordinates (a*,b*) of (−50,63), (46,71), (72,−45), and (−60,−48) as for a lightness of L*=50,
(11) a quadrangular region surrounded by lines connecting points having chromaticity coordinates (a*,b*) of (−43,71), (39,76), (63,−41), and (−56,−44) as for a lightness of L*=55,
(12) a quadrangular region surrounded by lines connecting points having chromaticity coordinates (a*,b*) of (−33,80), (31,85), (55,−36), and (−54,−39) as for a lightness of L*=60,
(13) a quadrangular region surrounded by lines connecting points having chromaticity coordinates (a*,b*) of (−22,91), (24,91), (47,−32), and (−49,−34) as for a lightness of L*=65,
(14) a quadrangular region surrounded by lines connecting points having chromaticity coordinates (a*,b*) of (−11,98), (17,98), (40,−27), and (−46,−27) as for a lightness of L*=70,
(15) a quadrangular region surrounded by lines connecting points having chromaticity coordinates (a*,b*) of (−5,122), (6,123), (29,−23), and (−41,−23) as for a lightness of L*=75,
(16) a quadrangular region surrounded by lines connecting points having chromaticity coordinates (a*,b*) of (−6,103), (5,103), (22,−17), and (−28,−17) as for a lightness of L*=80,
(17) a quadrangular region surrounded by lines connecting points having chromaticity coordinates (a*,b*) of (−7,69), (4,70), (19,−15), and (−17,−15) as for a lightness of L*=85, and
(18) a quadrangular region surrounded by lines connecting points having chromaticity coordinates (a*,b*) of (−4,48), (7,48), (15,−12), and (−12,−12) as for a lightness of L*=90.

3. A method of recognizing a region corresponding to an image storage sheet, comprising the steps of:
i) obtaining a read-out image, which has been acquired by covering an image storage sheet that contains a color image with an image storage sheet pushing surface of a platen cover and reading out an image of a region on the image storage sheet pushing surface of the platen cover, the region on the image storage sheet pushing surface containing the image storage sheet, and
ii) recognizing a region corresponding to the image storage sheet in the read-out image,
wherein the image storage sheet pushing surface of the platen cover has a periodical pattern, which is composed of a plurality of different color areas arrayed in a predetermined order and in abutment with one another, and
the region corresponding to the image storage sheet is recognized by judging that a pixel in the read-out image, which pixel represents an image different from the periodical pattern, is a pixel falling within the region corresponding to the image storage sheet,
wherein a size of each of the color areas in the periodical pattern falls within the range of 0.1 mm square to 1 mm square.

4. A method of recognizing a region corresponding to an image storage sheet, comprising the steps of:
i) obtaining a read-out image, which has been acquired by covering an image storage sheet that contains a color image with an image storage sheet pushing surface of a platen cover and reading out an image of a region on the image storage sheet pushing surface of the platen cover, the region on the image storage sheet pushing surface containing the image storage sheet, and
ii) recognizing a region corresponding to the image storage sheet in the read-out image,
wherein the image storage sheet pushing surface of the platen cover has a periodical pattern, which is composed of a plurality of different color areas arrayed in a predetermined order and in abutment with one another, and
the region corresponding to the image storage sheet is recognized by judging that a pixel in the read-out image, which pixel represents an image different from the periodical pattern, is a pixel falling within the region corresponding to the image storage sheet,
wherein one period in the periodical pattern falls within the range of a value two times as large as a spatial resolving power of the read-out image to a value 20 times as large as the spatial resolving power of the read-out image.

5. An image processing method, comprising the step of modeling a shape, which expresses boundaries of a region having been recognized as the region corresponding to the image storage sheet with a method of recognizing a region corresponding to an image storage sheet as defined in claim 1, 2, 3, or 4, into a predetermined shape.

6. An image processing method as defined in claim 5 wherein an image of the region, which has been modeled into the predetermined shape, is located within a frame of a template, which has been prepared previously, and a template-appended image is thereby formed.

7. An apparatus for recognizing a region corresponding to an image storage sheet, comprising:
i) means for obtaining a read-out image, which has been acquired by covering an image storage sheet that contains a color image with an image storage sheet pushing surface of a platen cover and reading out an image of a region on the image storage sheet pushing surface of the platen cover, the region on the image storage sheet pushing surface containing the image storage sheet, and
ii) recognition means for recognizing a region corresponding to the image storage sheet in the read-out image,
wherein the read-out image is an image having been read out by utilizing the platen cover provided with the image storage sheet pushing surface having a color other than colors which are ordinarily contained in image storage sheets, and
the recognition means recognizes the region corresponding to the image storage sheet by judging that a pixel in the read-out image, which pixel represents a color different from the color of the image storage sheet pushing surface of the platen cover, is a pixel falling within the region corresponding to the image storage sheet.

8. An apparatus for recognizing a region corresponding to an image storage sheet, comprising:
   i) means for obtaining a read-out image, which has been acquired by covering an image storage sheet that contains a color image with an image storage sheet pushing surface of a platen cover and reading out an image of a region on the image storage sheet pushing surface of the platen cover, the region on the image storage sheet pushing surface containing the image storage sheet, and
   ii) recognition means for recognizing a region corresponding to the image storage sheet in the read-out image,
   wherein the read-out image is an image having been read out by utilizing the platen cover provided with the image storage sheet pushing surface having a periodical pattern, which is composed of a plurality of different color areas arrayed in a predetermined order and in abutment with one another, and
   the recognition means recognizes the region corresponding to the image storage sheet by judging that a pixel in the read-out image, which pixel represents an image different from the periodical pattern, is a pixel falling within the region corresponding to the image storage sheet.

9. An image processing apparatus, comprising modeling means for modeling a shape, which expresses boundaries of a region having been recognized as the region corresponding to the image storage sheet with an apparatus for recognizing a region corresponding to an image storage sheet as defined in claim 7 or 8, into a predetermined shape.

10. An image processing apparatus as defined in claim 9 further comprising image forming means for locating an image of the region, which has been modeled by the modeling means into the predetermined shape, within a frame of a template, which has been prepared previously, and thereby forming a template-appended image.

11. A platen cover for use in an apparatus for reading out an image from an image storage sheet, the platen cover comprising an image storage sheet pushing surface having a color outside a chromaticity range, which chromaticity range is approximately circumscribed with one of the following regions on L*a*b* chromaticity diagrams illustrating chromaticity coordinates (a*,b*):
   (1) a quadrangular region surrounded by lines connecting points having chromaticity coordinates (a*,b*) of (−28, 15), (15,15), (32,−43), and (13,−43) as for a lightness of L*=5,
   (2) a triangular region surrounded by lines connecting points having chromaticity coordinates (a*,b*) of (−33, 20), (14,20), and (47,−92) as for a lightness of L*=10,
   (3) a quadrangular region surrounded by lines connecting points having chromaticity coordinates (a*,b*) of (−37, 20), (26,20), (54,−73), and (30,−75) as for a lightness of L*=15,
   (4) a quadrangular region surrounded by lines connecting points having chromaticity coordinates (a*,b*) of (−38, 20), (35,26), (57,−68), and (17,−72) as for a lightness of L*=20,
   (5) a quadrangular region surrounded by lines connecting points having chromaticity coordinates (a*,b*) of (−46, 26), (44,34), (62,−64), and (6,−70) as for a lightness of L*=25,
   (6) a quadrangular region surrounded by lines connecting points having chromaticity coordinates (a*,b*) of (−57, 33), (53,43), (67,−57), and (0,−68) as for a lightness of L*=30,
   (7) a quadrangular region surrounded by lines connecting points having chromaticity coordinates (a*,b*) of (−62, 40), (61,51), (73,−56), and (−17,−62) as for a lightness of L*=35,
   (8) a quadrangular region surrounded by lines connecting points having chromaticity coordinates (a*,b*) of (−68, 47), (57,58), (82,−52), and (−51,−57) as for a lightness of L*=40,
   (9) a quadrangular region surrounded by lines connecting points having chromaticity coordinates (a*,b*) of (−63, 54), (53,54), (56,−47), and (−50,−53) as for a lightness of L*=45,
   (10) a quadrangular region surrounded by lines connecting points having chromaticity coordinates (a*,b*) of (−50,63), (46,71), (72,−45), and (−60,−48) as for a lightness of L*=50,
   (11) a quadrangular region surrounded by lines connecting points having chromaticity coordinates (a*,b*) of (−43,71), (39,76), (63,−41), and (−56,−44) as for a lightness of L*=55,
   (12) a quadrangular region surrounded by lines connecting points having chromaticity coordinates (a*,b*) of (−33,80), (31,85), (55,−36), and (−54,−39) as for a lightness of L*=60,
   (13) a quadrangular region surrounded by lines connecting points having chromaticity coordinates (a*,b*) of (−22,91), (24,91), (47,−32), and (−49,−34) as for a lightness of L*=65,
   (14) a quadrangular region surrounded by lines connecting points having chromaticity coordinates (a*,b*) of (−11,98), (17,98), (40,−27), and (−46,−27) as for a lightness of L*=70,
   (15) a quadrangular region surrounded by lines connecting points having chromaticity coordinates (a*,b*) of (−5,122), (6,123), (29,−23), and (−41,−23) as for a lightness of L*=75,
   (16) a quadrangular region surrounded by lines connecting points having chromaticity coordinates (a*,b*) of (−6,103), (5,103), (22,−17), and (−28,−17) as for a lightness of L*=80,
   (17) a quadrangular region surrounded by lines connecting points having chromaticity coordinates (a*,b*) of (−7,69), (4,70), (19,−15), and (−17,−15) as for a lightness of L*=85, and
   (18) a quadrangular region surrounded by lines connecting points having chromaticity coordinates (a*,b*) of (−4,48), (7,48), (15,−12), and (−12,−12) as for a lightness of L*=90.

12. A sheet for a platen cover, wherein one of opposite surfaces of the sheet has a color outside a chromaticity range, which chromaticity range is approximately circumscribed with one of the following regions on L*a*b* chromaticity diagrams illustrating chromaticity coordinates (a*, b*):
   (1) a quadrangular region surrounded by lines connecting points having chromaticity coordinates (a*,b*) of (−28, 15), (15,15), (32,−43), and (13,−43) as for a lightness of L*=5,
   (2) a triangular region surrounded by lines connecting points having chromaticity coordinates (a*,b*) of (−33, 20), (14,20), and (47,−92) as for a lightness of L*=10,
   (3) a quadrangular region surrounded by lines connecting points having chromaticity coordinates (a*,b*) of (−37, 20), (26,20), (54,−73), and (30,−75) as for a lightness of L*=15, (4) a quadrangular region surrounded by lines connecting points having chromaticity coordinates (a*,b*) of (−38, 20), (35,26), (57,−68), and (17,−72) as for a lightness of L*=20, (5) a quadrangular region surrounded by lines connecting points having chromaticity coordinates (a*,b*) of (−46, 26), (44,34), (62,−64), and (6,−70) as for a lightness of L*=25, (6) a quadrangular region surrounded by lines connecting points having chromaticity coordinates (a*,b*) of (−57, 33), (53,43), (67,−57), and (0,−68) as for a lightness of L*=30, (7) a quadrangular region surrounded by lines connecting points having chromaticity coordinates (a*,b*) of (−62, 40), (61,51), (73,−56), and (−17,−62) as for a lightness of L*=35, (8) a quadrangular region surrounded by lines connecting points having chromaticity coordinates (a*,b*) of (−68, 47), (57,58), (82,−52), and (−51,−57) as for a lightness of L*=40, (9) a quadrangular region surrounded by lines connecting points having chromaticity coordinates (a*,b*) of (−63, 54), (53,54), (56,−47), and (−50,−53) as for a lightness of L*=45,

(10) a quadrangular region surrounded by lines connecting points having chromaticity coordinates (a*,b*) of (−50,63), (46,71), (72,−45), and (−60,−48) as for a lightness of L*=50,

(11) a quadrangular region surrounded by lines connecting points having chromaticity coordinates (a*,b*) of (−43,71), (39,76), (63,−41), and (−56,−44) as for a lightness of L*=55,

(12) a quadrangular region surrounded by lines connecting points having chromaticity coordinates (a*,b*) of (−33,80), (31,85), (55,−36), and (−54,−39) as for a lightness of L*=60,

(13) a quadrangular region surrounded by lines connecting points having chromaticity coordinates (a*,b*) of (−22,91), (24,91), (47,−32), and (−49,−34) as for a lightness of L*=65,

(14) a quadrangular region surrounded by lines connecting points having chromaticity coordinates (a*,b*) of (−11,98), (17,98), (40,−27), and (−46,−27) as for a lightness of L*=70,

(15) a quadrangular region surrounded by lines connecting points having chromaticity coordinates (a*,b*) of (−5,122), (6,123), (29,−23), and (−41,−23) as for a lightness of L*=75,

(16) a quadrangular region surrounded by lines connecting points having chromaticity coordinates (a*,b*) of (−6,103), (5,103), (22,−17), and (−28,−17) as for a lightness of L*=80,

(17) a quadrangular region surrounded by lines connecting points having chromaticity coordinates (a*,b*) of (−7,69), (4,70), (19,−15), and (−17,−15) as for a lightness of L*=85, and

(18) a quadrangular region surrounded by lines connecting points having chromaticity coordinates (a*,b*) of (−4,48), (7,48), (15,−12), and (−12,−12) as for a lightness of L*=90.

13. A recording medium, on which a program for causing a computer to execute a method of recognizing a region corresponding to an image storage sheet has been recorded and from which the computer is capable of reading the program, wherein the program comprises the procedures for:
i) obtaining a read-out image, which has been read out by an apparatus for reading out an image from an image storage sheet comprising:
a platen cover for use in an apparatus for reading out an image from an image storage sheet, the platen cover comprising an image storage sheet pushing surface having a color other than colors which are ordinarily contained in image storage sheets containing color images, and
ii) recognizing the region corresponding to the image storage sheet by judging that a pixel in the read-out image, which pixel represents a color different from the color of the image storage sheet pushing surface of the platen cover, is a pixel falling within the region corresponding to the image storage sheet.

14. A recording medium, on which a program for causing a computer to execute a method of recognizing a region corresponding to an image storage sheet has been recorded and from which the computer is capable of reading the program, wherein the program comprises the procedures for:
i) obtaining a read-out image, which has been read out by an apparatus for reading out an image from an image storage sheet, comprising:
a platen cover for use in an apparatus for reading out an image from an image storage sheet, the platen cover comprising an image storage sheet pushing surface having a periodical patten, which is composed of a plurality of different color areas arrayed in a predetermined order and in abutment with one another, and
ii) recognizing the region corresponding to the image storage sheet by judging that a pixel in the read-out image, which pixel represents an image different from the periodical pattern, is a pixel falling within the region corresponding to the image storage sheet.

15. A sheet for a platen cover, wherein one of opposite surfaces of the sheet has a color other than colors which are ordinarily contained in image storage sheets containing color images, and wherein said image storage sheets comprise a photoprint.

16. A sheet for a platen cover, wherein one of opposite surfaces of the sheet has a color other than colors which are ordinarily contained in image storage sheets containing color images, and wherein said sheet is releasably fitted to the side of the platen cover.

17. A sheet for a plate cover according to claim 16, wherein said sheet is fitted to said platen cover by at least one of double-faced adhesive tape, fitting claws and a hinge structure.

18. An apparatus for reading out an image from an image storage sheet, comprising a platen cover for use in an apparatus for reading out an image from an image storage sheet, the platen cover comprising an image storage sheet pushing surface having a color outside a chromaticity range, which chromaticity range is approximately circumscribed with one of the following regions on L*a*b* chromaticity diagrams illustrating chromaticity coordinates (a*,b*):

(1) a quadrangular region surrounded by lines connecting points having chromaticity coordinates (a*,b*) of (−28, 15), (15,15), (32,−43), and (13,−43) as for a lightness of L*=5, (2) a triangular region surrounded by lines connecting points having chromaticity coordinates (a*,b*) of (−33, 20), (14,20), and (47,−92) as for a lightness of L*=10, (3) a quadrangular region surrounded by lines connecting points having chromaticity coordinates (a*,b*) of (−37, 20), (26,20), (54,−73), and (30,−75) as for a lightness of L*=15, (4) a quadrangular region surrounded by lines connecting points having chromaticity coordinates (a*,b*) of (−38, 20), (35,26), (57,−68), and (17,−72) as for a lightness of L*=20, (5) a quadrangular region surrounded by lines connecting points having chromaticity coordinates (a*,b*) of (−46, 26), (44,34), (62,−64), and (6,−70) as for a lightness of L*=25, (6) a quadrangular region surrounded by lines connecting points having chromaticity coordinates (a*,b*) of (−57, 33), (53,43), (67,−57), and (0,−68) as for a lightness of L*=30, (7) a quadrangular region surrounded by lines connecting points having chromaticity coordinates (a*,b*) of (−62, 40), (61,51), (73,−56), and (−17,−62) as for a lightness of L*=35, (8) a quadrangular region surrounded by lines connecting points having chromaticity coordinates (a*,b*) of (−68, 47), (57,58), (82,−52), and (−51,−57) as for a lightness of L*=40, (9) a quadrangular region surrounded by lines connecting points having chromaticity coordinates (a*,b*) of (−63, 54), (53,54), (56,−47), and (−50,−53) as for a lightness of L*=45,

(10) a quadrangular region surrounded by lines connecting points having chromaticity coordinates (a*,b*) of (−50,63), (46,71), (72,−45), and (−60,−48) as for a lightness of L*=50,

(11) a quadrangular region surrounded by lines connecting points having chromaticity coordinates (a*,b*) of (−43,71), (39,76), (63,−41), and (−56,−44) as for a lightness of L*=55,

(12) a quadrangular region surrounded by lines connecting points having chromaticity coordinates (a*,b*) of (−33,80), (31,85), (55,−36), and (−54,−39) as for a lightness of L*=60,

(13) a quadrangular region surrounded by lines connecting points having chromaticity coordinates (a*,b*) of (−22,91), (24,91), (47,−32), and (−49,−34) as for a lightness of L*=65,

(14) a quadrangular region surrounded by lines connecting points having chromaticity coordinates (a*,b*) of (−11,98), (17,98), (40,−27), and (−46,−27) as for a lightness of L*=70,

(15) a quadrangular region surrounded by lines connecting points having chromaticity coordinates (a*,b*) of (−5,122), (6,123), (29,−23), and (−41,−23) as for a lightness of L*=75,

(16) a quadrangular region surrounded by lines connecting points having chromaticity coordinates (a*,b*) of (−6,103), (5,103), (22,−17), and (−28,−17) as for a lightness of L*=80,

(17) a quadrangular region surrounded by lines connecting points having chromaticity coordinates (a*,b*) of (−7,69), (4,70), (19,−15), and (−17,−15) as for a lightness of L*=85, and

(18) a quadrangular region surrounded by lines connecting points having chromaticity coordinates (a*,b*) of (−4,48), (7,48), (15,−12), and (−12,−12) as for a lightness of L*=90.

* * * * *